(12) United States Patent
Suzuki

(10) Patent No.: US 9,114,610 B2
(45) Date of Patent: Aug. 25, 2015

(54) IMAGE PROCESSING DEVICE

(71) Applicant: BROTHER KOGYO KABUSHIKI KAISHA, Nagoya-shi, Aichi-ken (JP)

(72) Inventor: Katsuaki Suzuki, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/226,253

(22) Filed: Mar. 26, 2014

(65) Prior Publication Data

US 2014/0292873 A1 Oct. 2, 2014

(30) Foreign Application Priority Data

Mar. 29, 2013 (JP) ................................ 2013-073211

(51) Int. Cl.
| | |
|---|---|
| B41J 29/38 | (2006.01) |
| B41J 2/12 | (2006.01) |
| G06K 15/02 | (2006.01) |
| H04N 1/407 | (2006.01) |
| H04N 1/40 | (2006.01) |
| H04N 1/405 | (2006.01) |

(52) U.S. Cl.
CPC ............... *B41J 2/12* (2013.01); *G06K 15/1868* (2013.01); *G06K 15/1878* (2013.01); *H04N 1/407* (2013.01); *H04N 1/4052* (2013.01); *H04N 1/40087* (2013.01)

(58) Field of Classification Search
CPC .... H01N 1/4052; H01N 1/4053; H01N 1/407
USPC ............ 347/9, 15; 358/3.01, 3.03–3.05, 3.21, 358/3.22
See application file for complete search history.

(56) References Cited

U.S. PATENT DOCUMENTS

| | | | |
|---|---|---|---|
| 6,707,579 B1 | 3/2004 | Komiya et al. | |
| 2005/0237575 A1* | 10/2005 | Yamazaki | ................... 358/3.03 |
| 2008/0259361 A1* | 10/2008 | Kakutani | |
| 2009/0073495 A1* | 3/2009 | Ogawa | ........................ 358/3.01 |

FOREIGN PATENT DOCUMENTS

| | | |
|---|---|---|
| JP | 2000-52571 A | 2/2000 |
| JP | 2004-230672 A | 8/2004 |

* cited by examiner

*Primary Examiner* — Julian Huffman
*Assistant Examiner* — Sharon Polk
(74) *Attorney, Agent, or Firm* — Merchant & Gould PC

(57) ABSTRACT

A corrector performs designating a target pixel belonging to a pixel array corresponding to an ejection port, the target pixel being designated sequentially as one of pixels arranged in an array direction, the pixel array being formed with the pixels in the N-value image data corresponding to dots formed by the ejection port respectively, allocating a corresponding one of N representative tone values out of L tone values of L tones to a tone value of the target pixel of the N-value image data, adding the correction value to a representative tone value of the target pixel, thereby obtaining a corrected tone value of the target pixel, quantizing the corrected tone value of the target pixel to N tones; and diffusing an error generated in quantizing the corrected tone value to the corrected tone value of an adjacent pixel adjacent to the target pixel in the array direction.

19 Claims, 11 Drawing Sheets

ERROR DIFFUSION MATRIX

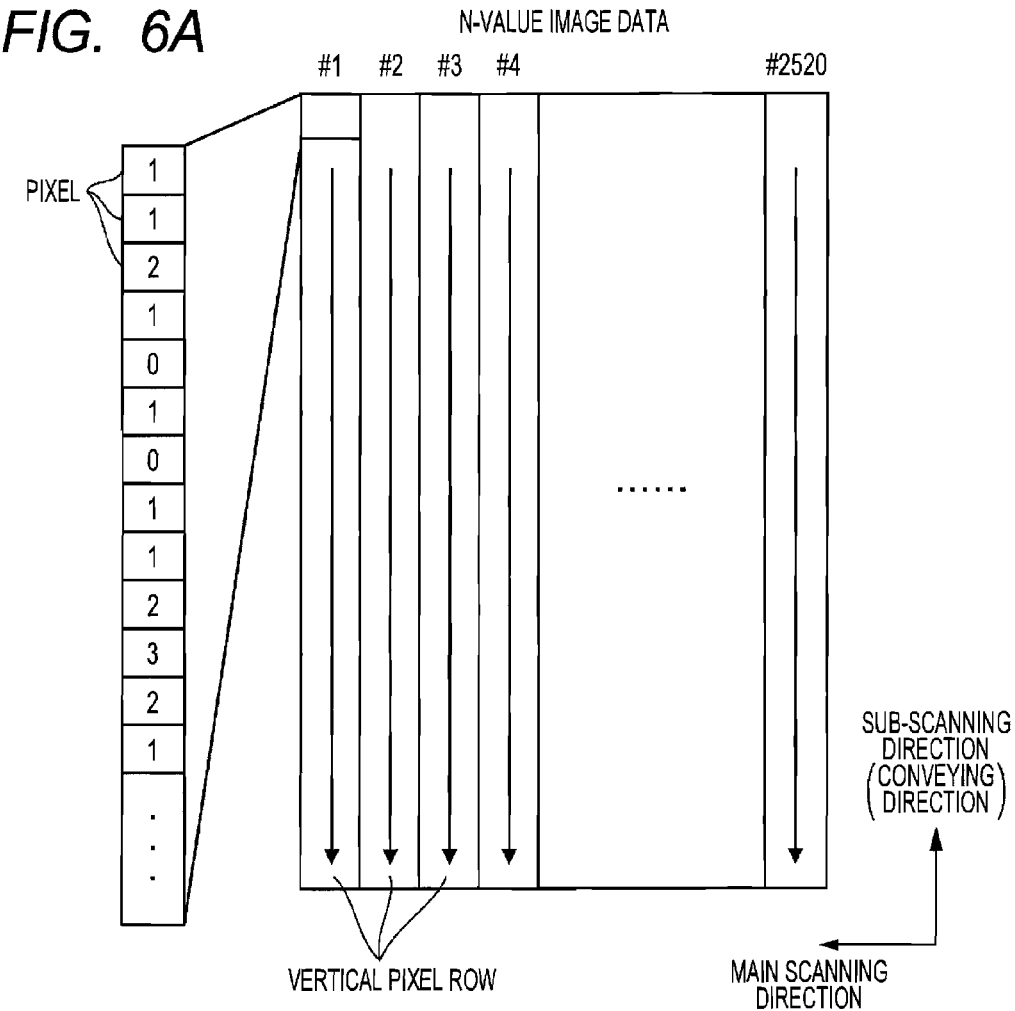

| EJECTION PORT | TONE | | | |
|---|---|---|---|---|
| | 0: NO EJECTION | 1: SMALL DROPLET | 2: MEDIUM DROPLET | 3: LARGE DROPLET |
| #1 | 0 | 8 | 20 | 25 |
| #2 | 0 | 5 | 14 | 20 |
| #3 | 0 | -30 | -60 | -90 |
| ⋮ | ⋮ | ⋮ | ⋮ | ⋮ |
| #2520 | 0 | 10 | 18 | 29 |

IMAGE PROCESSING DEVICE

CROSS REFERENCE TO RELATED APPLICATIONS

This application claims priority from Japanese Patent Application No. 2013-073211 filed Mar. 29, 2013. The entire content of the priority application is incorporated herein by reference.

TECHNICAL FIELD

The invention relates to an image processing device, a method of controlling the image processing device, and a storage medium storing instructions of controlling the image processing device.

BACKGROUND

As a liquid ejection apparatus for recording an image by ejecting liquid onto a recording medium, there is known an inkjet recording apparatus including a liquid ejection head in which a plurality of ejection ports for ejecting ink onto a recording medium is formed. In general, the number of tones (e.g., 2 to 4 tones) that can be expressed by the inkjet recording apparatus is smaller than the number of tones (e.g., 256 tones) in display image data (multi-value image data) displayed on a liquid crystal display provided in a host computer. Therefore, when an image according to multi-value image data is recorded on a recording medium, tones of the multi-value image data are quantized to be decreased to tones that can be expressed by the inkjet recording apparatus. As one of the methods for the quantization, an error diffusion process is known. The error diffusion process is image processing, in which a tone value is reduced and thereby an error generated in each pixel is diffused to peripheral pixels.

Further, with respect to the inkjet recording apparatus, in production of a liquid ejection head, an ejection amount of ink varies in each ejection port. Therefore, when an image is recorded on a recording medium using such a liquid ejection head, density nonuniformity is generated in the image recorded on the recording medium.

SUMMARY

In view of the foregoing, the invention provides an image processing device. The image processing device is configured to generate input image data used in a liquid ejecting device including: a liquid ejecting head having an ejection port for ejecting liquid onto a recording medium; a moving mechanism configured to move at least one of the liquid ejecting head and the recording medium such that a relative positional relationship of the liquid ejecting head and the recording medium varies with respect to a predetermined direction; and a recording controller configured to control the liquid ejecting head and the moving mechanism based on the input image data in which tone values of respective pixels corresponding to dots on one recording medium are represented by N tones (N is an integer greater than or equal to two) such that liquid of liquid amounts associated with the tone values of the respective pixels in the input image data is ejected to positions of dots corresponding to the respective pixels. The image processing device includes: a correction-value memory storing a correction value in association with the ejection port, the correction value being for correcting variations in the liquid amounts of liquid ejected from the ejection port; a quantizer configured to generate N-value image data from M-value image data, the M-value image data being image data in which tone values of respective pixels corresponding to dots on one recording medium are represented by M tones (M is an integer greater than the integer N), the N-value image data being image data in which tone values of respective pixels are represented by N tones; and a corrector configured to correct the N-value image data generated by the quantizer based on the correction value, thereby generating the input image data. The corrector is configured to perform: designating a target pixel belonging to a pixel array corresponding to the ejection port, the target pixel being designated, sequentially from one end to an other end of the pixel array, as one of a plurality of pixels arranged in an array direction of the pixel array, the pixel array being formed with the plurality of pixels in the N-value image data corresponding to a plurality of dots formed by the ejection port respectively; allocating a corresponding one of N representative tone values out of L tone values of L tones (L is an integer greater than the integer N) to a tone value of the target pixel of the N-value image data generated by the quantizer; adding the correction value to a representative tone value of the target pixel, thereby obtaining a corrected tone value of the target pixel; quantizing the corrected tone value of the target pixel to N tones; and diffusing an error generated in quantizing the corrected tone value to the corrected tone value of an adjacent pixel adjacent to the target pixel in the array direction.

According to another aspect, the invention also provides an image processing device. The image processing device is configured to generate input image data used in a liquid ejecting device including a liquid ejecting head having an ejection port for ejecting liquid onto a recording medium. The image processing device includes: a correction-value memory storing a correction value in association with the ejection port, the correction value being for correcting variations in the liquid amounts of liquid ejected from the ejection port; a quantizer configured to generate N-value image data from M-value image data, the M-value image data being image data in which tone values of respective pixels corresponding to dots on one recording medium are represented by M tones, the N-value image data being image data in which tone values of respective pixels are represented by N tones (N is an integer greater than or equal to two; M is an integer greater than the integer N); and a corrector configured to correct the N-value image data generated by the quantizer based on the correction value, thereby generating the input image data. The corrector is configured to perform: designating a target pixel belonging to a pixel array corresponding to the ejection port, the target pixel being designated, sequentially from one end to an other end of the pixel array, as one of a plurality of pixels arranged in an array direction of the pixel array, the pixel array being formed with the plurality of pixels in the N-value image data corresponding to a plurality of dots formed by the ejection port respectively; allocating a corresponding one of N representative tone values out of L tone values of L tones (L is an integer greater than the integer N) to a tone value of the target pixel of the N-value image data generated by the quantizer; adding the correction value to a representative tone value of the target pixel, thereby obtaining a corrected tone value of the target pixel; quantizing the corrected tone value of the target pixel to N tones; and diffusing an error generated in quantizing the corrected tone value to the corrected tone value of an adjacent pixel adjacent to the target pixel in the array direction.

According to another aspect, the invention also provides a method of controlling an image processing device configured to generate input image data used in a liquid ejecting device including: a liquid ejecting head having an ejection port for ejecting liquid onto a recording medium; a moving mechanism configured to move at least one of the liquid ejecting head and the recording medium such that a relative positional relationship of the liquid ejecting head and the recording medium varies with respect to a predetermined direction; and a recording controller configured to control the liquid ejecting head and the moving mechanism based on the input image data in which tone values of respective pixels corresponding to dots on one recording medium are represented by N tones (N is an integer greater than or equal to two) such that liquid of liquid amounts associated with the tone values of the respective pixels in the input image data is ejected to positions of dots corresponding to the respective pixels. The image processing device includes a correction-value memory storing a correction value in association with the ejection port, the correction value being for correcting variations in the liquid amounts of liquid ejected from the ejection port. The method includes: generating N-value image data from M-value image data, the M-value image data being image data in which tone values of respective pixels corresponding to dots on one recording medium are represented by M tones (M is an integer greater than the integer N), the N-value image data being image data in which tone values of respective pixels are represented by N tones; and correcting the N-value image data based on the correction value, thereby generating the input image data. The correcting includes: designating a target pixel belonging to a pixel array corresponding to the ejection port, the target pixel being designated, sequentially from one end to an other end of the pixel array, as one of a plurality of pixels arranged in an array direction of the pixel array, the pixel array being formed with the plurality of pixels in the N-value image data corresponding to a plurality of dots formed by the ejection port respectively; allocating a corresponding one of N representative tone values out of L tone values of L tones (L is an integer greater than the integer N) to a tone value of the target pixel of the N-value image data; adding the correction value to a representative tone value of the target pixel, thereby obtaining a corrected tone value of the target pixel; quantizing the corrected tone value of the target pixel to N tones; and diffusing an error generated in quantizing the corrected tone value to the corrected tone value of an adjacent pixel adjacent to the target pixel in the array direction.

According to still another aspect, the invention also provides a non-transitory computer-readable storage medium storing computer-readable instructions executable by a processor of an image processing device configured to generate input image data used in a liquid ejecting device including a liquid ejecting head having an ejection port for ejecting liquid onto a recording medium. The image processing device includes a correction-value memory storing a correction value in association with the ejection port, the correction value being for correcting variations in the liquid amounts of liquid ejected from the ejection port. When executed by the processor, the computer-readable instructions cause the processor to perform: generating N-value image data from M-value image data, the M-value image data being image data in which tone values of respective pixels corresponding to dots on one recording medium are represented by M tones, the N-value image data being image data in which tone values of respective pixels are represented by N tones (N is an integer greater than or equal to two; M is an integer greater than the integer N); and correcting the N-value image data based on the correction value, thereby generating the input image data. The correcting includes: designating a target pixel belonging to a pixel array corresponding to the ejection port, the target pixel being designated, sequentially from one end to an other end of the pixel array, as one of a plurality of pixels arranged in an array direction of the pixel array, the pixel array being formed with the plurality of pixels in the N-value image data corresponding to a plurality of dots formed by the ejection port respectively; allocating a corresponding one of N representative tone values out of L tone values of L tones (L is an integer greater than the integer N) to a tone value of the target pixel of the N-value image data; adding the correction value to a representative tone value of the target pixel, thereby obtaining a corrected tone value of the target pixel; quantizing the corrected tone value of the target pixel to N tones; and diffusing an error generated in quantizing the corrected tone value to the corrected tone value of an adjacent pixel adjacent to the target pixel in the array direction.

BRIEF DESCRIPTION OF THE DRAWINGS

Embodiments in accordance with the invention will be described in detail with reference to the following figures wherein:

FIG. 6A is an explanatory diagram of N-value image data generated by the quantization processing ASIC shown in FIG. 1;

FIG. 6B represents a table illustrating relationships among each of tones, liquid droplet sizes, liquid droplet amounts, and representative tone values of N-value data;

FIG. 6C represents a table illustrating a relationship between error-added tone values and output tone values;

DETAILED DESCRIPTION

Figure 1:
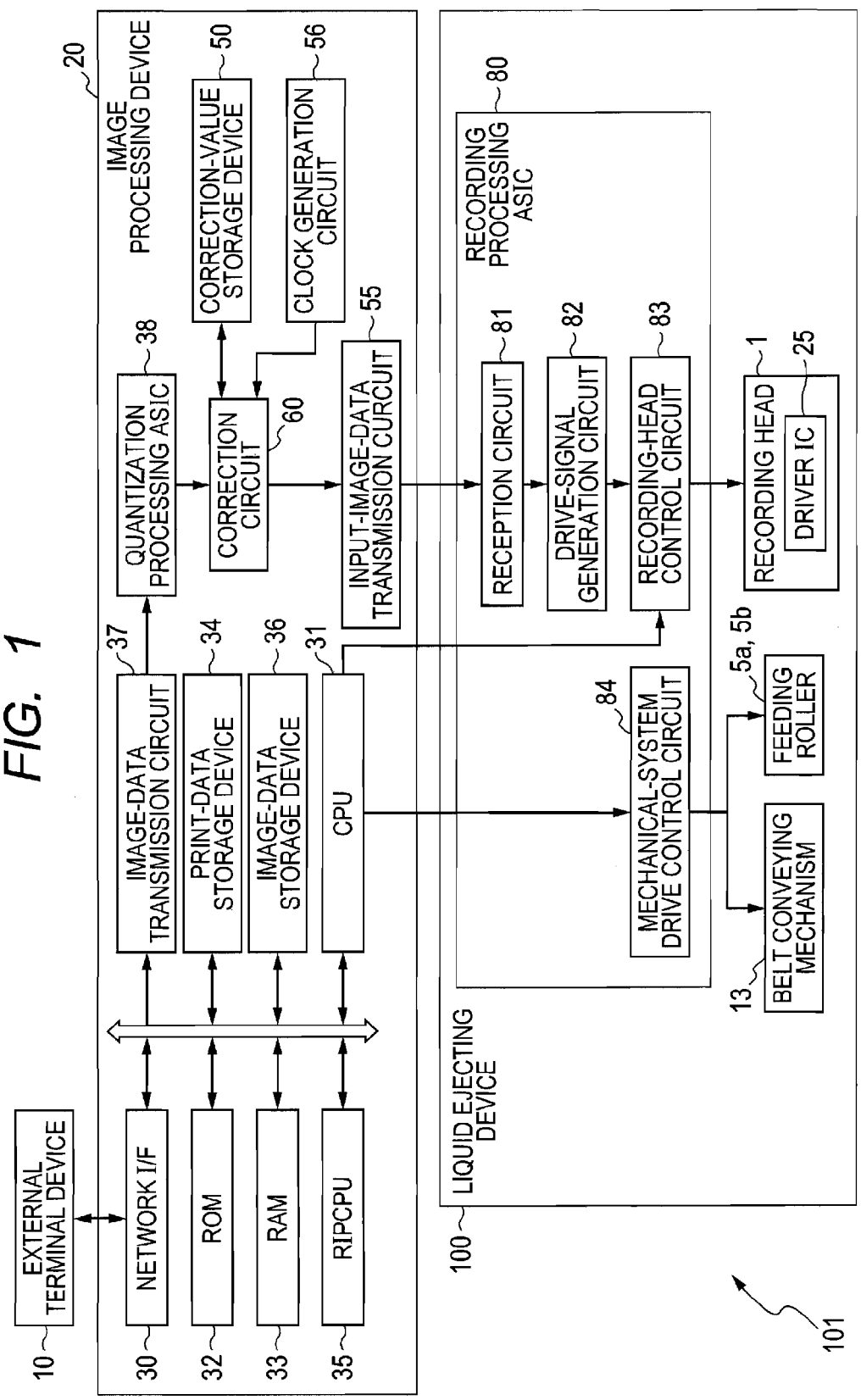
FIG. 1 is an electrical configuration of an inkjet printer according to an embodiment of the invention.

An inkjet printer provided with an image processing device and a liquid ejecting device according to an embodiment of the invention will be described below with reference to drawings. As shown in FIG. 1, an inkjet printer 101 is provided with a liquid ejecting device 100 for recording images on a sheet P serving as a recording medium, and an image processing device 20 for transmitting input image data as a recording subject to the liquid ejecting device 100. The image processing device 20 applies image processing to print data (i.e. data written by PDL (page description language))

received from an external terminal device 10 such as a host computer, and transmits data subsequent to the image processing, as input image data, to the liquid ejecting device 100. Details of the image processing device 20 are described later. Also, input image data are described below as image data for an image recorded on the sheet P of one page.

Figure 2:
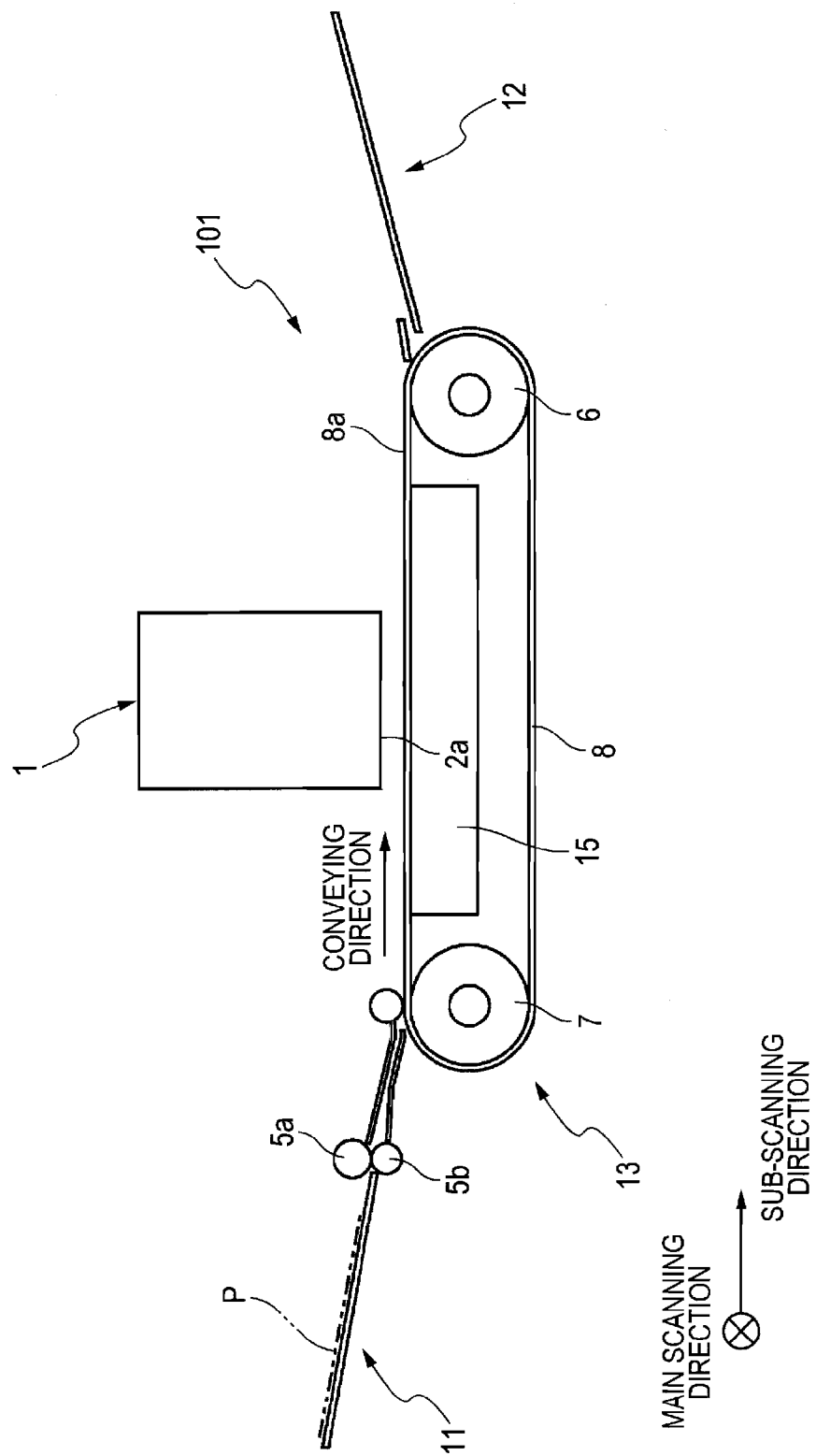
FIG. 2 is a schematic side view of a liquid ejecting device shown in FIG. 1.

The liquid ejecting device 100 is a monochromatic inkjet recording device having a recording head 1 that ejects black ink and a recording processing ASIC 80 that controls the recording head 1. As shown in FIG. 2, the liquid ejecting device 100 internally has a conveying path formed to convey the sheet P from a paper feed tray 11 to a paper ejection tray 12. Immediately downstream of the paper feed tray 11, a pair of feed rollers 5a and 5b is placed to hold and convey paper. The pair of feed rollers 5a and 5b sends out the sheet P from the paper feed tray 11 to the right direction in FIG. 2. The sheet P sent out by the pair of feed rollers 5a and 5b is supplied to a belt conveying mechanism 13. The belt conveying mechanism 13 includes two belt rollers 6 and 7, an endless conveying belt 8 wound around both of the rollers 6 and 7 so as to be stretched over therebetween, and a platen 15 placed in a position opposing the recording head 1 in an area surrounded by the conveying belt 8. A motor not shown causes the belt roller 6 to rotate clockwise, whereby the conveying belt 8 rotates clockwise. The conveying belt 8 therefore holds and conveys the sheet P, which is pressed against an adhesive outer peripheral surface of the conveying belt 8, to the paper ejection tray 12. In the present embodiment, the feed rollers 5a and 5b and the belt conveying mechanism 13 serve as a conveying mechanism.

The recording head 1 is a line-type head that extends in the main scanning direction and that ejects ink onto the sheet P that is conveyed by the belt conveying mechanism 13 in a state where the recording head 1 is fixed at a position. That is, the inkjet printer 101 is a line-type printer. A bottom surface of the recording head 1 is used as an ejection surface 2a opposing a conveying surface 8a positioned on an upper side of an outer periphery surface of the conveying belt 8. When the sheet P conveyed by the conveying belt 8 passes just beneath the recording head 1, ink droplets are ejected from the ejection surface 2a toward an upper surface or the printed side of the sheet P. Therefore, a desired monochromatic image is created on the sheet P. In the present embodiment, the sub-scanning direction is a direction parallel to the conveying direction of the sheet P by the belt conveying mechanism 13, and the main scanning direction is a direction perpendicular to the sub-scanning direction and parallel to a horizontal surface.

Figure 3:
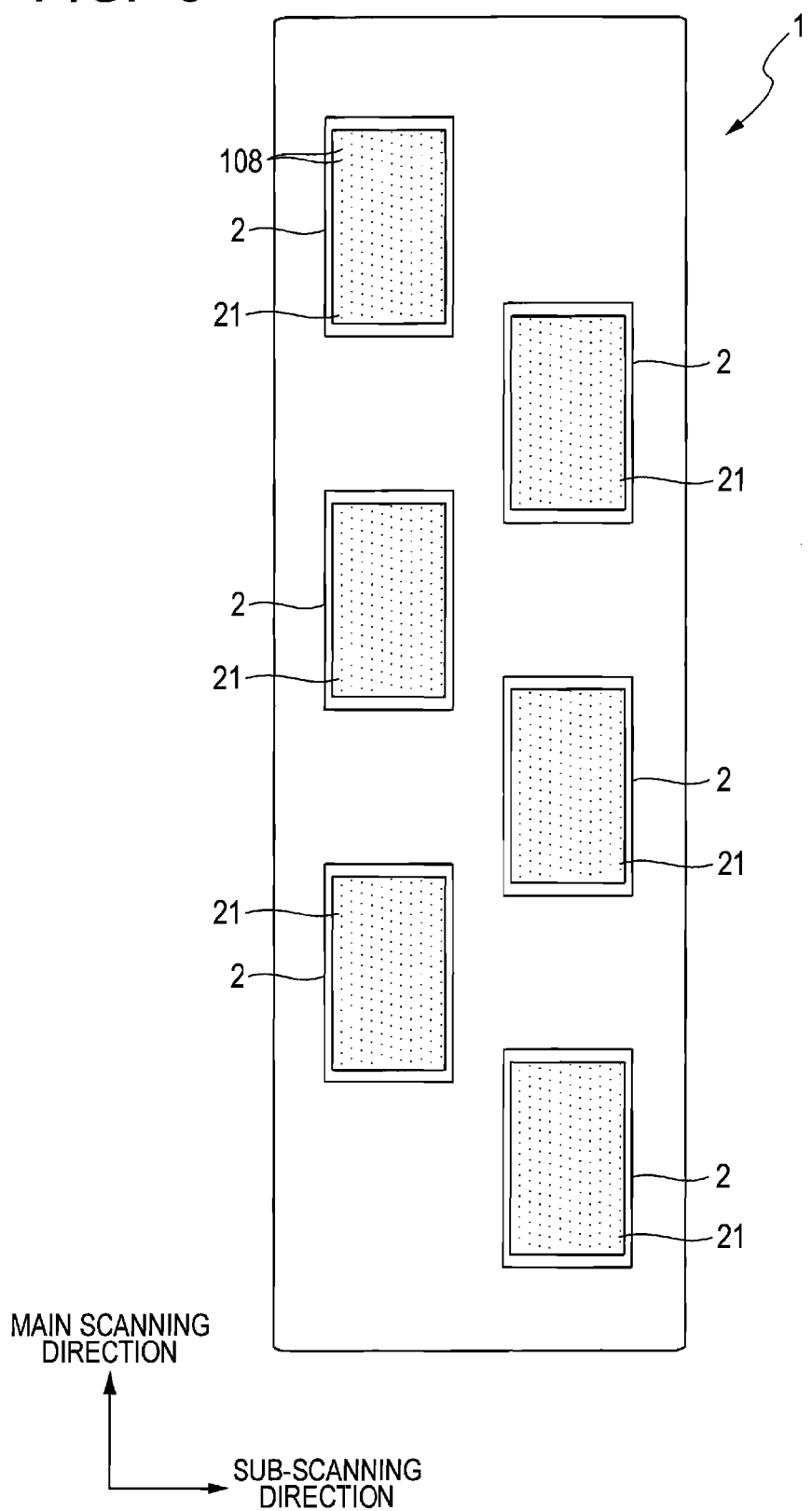
FIG. 3 is a plan view of a recording head shown in FIG. 1.
Figure 4:
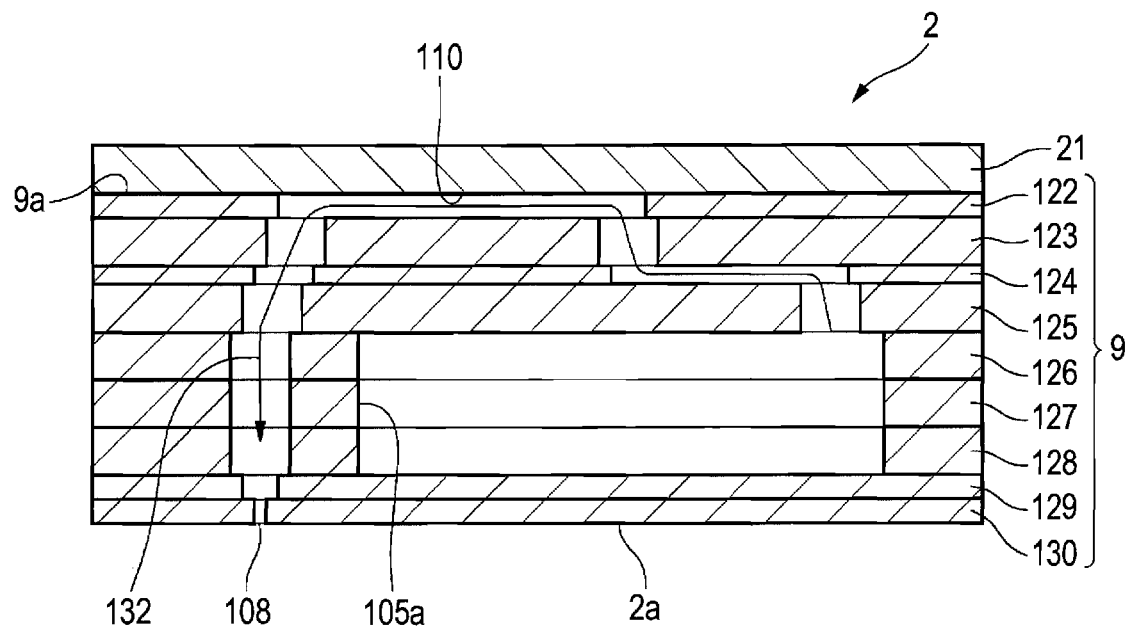
FIG. 4 is a partial cross-sectional view illustrating individual flow channels of a head unit shown in FIG. 3.

Next, the specific configuration of the recording head 1 will be described with reference to FIGS. 3 and 4. As shown in FIG. 3, the recording head 1 includes six head units 2 that are separated from one another and that are arranged in a staggered manner in the main scanning direction. The six head units 2 have the same configuration. As shown in FIG. 4, each of the head units 2 includes a channel unit 9, an actuator unit 21 fixed to an upper surface 9a of the channel unit 9, a driver IC 25 (see FIG. 1), and a reservoir unit (not shown). Ink is supplied from a cartridge to the reservoir unit in which a common liquid channel including a reservoir for temporarily retaining ink is formed. Each of the actuator units 21 includes a plurality of individual electrodes arranged to oppose a plurality of the pressure chambers 110 formed in the channel unit 9 and has a function to selectively apply ejection energy to ink held in the pressure chambers 110.

Each of the channel units 9 is a layered body formed by layering nine rectangular metal plates 122 to 130. Ink supply ports connected to the reservoir unit are opened in the upper surfaces 9a of the channel units 9. In the inside of the channel units 9, a plurality of manifold channels (not shown) with one end connected to the respective ink supply ports, a plurality of sub manifold channels 105a branched from the respective manifold channels, and multiple individual ink channels 132 connected to the respective sub manifold channels 105a are formed. Each of the individual ink channels 132 includes an aperture for adjusting channel resistance; starting from an outlet of the sub manifold channel 105a and reaches the ejection port 108 via the pressure chamber 110. A plurality of the pressure chambers 110 is arranged in a matrix form in the upper surfaces 9a of the channel units 9. Meanwhile, the ejection surface 2a being the lower surface of the channel unit 9 has the ejection ports 108 that are arranged in a matrix form or in a two-dimensional and regular manner corresponding to the respective pressure chambers 110.

Next, the actuator units 21 will be described. Each of the actuator units 21 includes a plurality of actuators opposing the respective pressure chambers 110. Each of the actuators selectively applies ejection energy to ink held in the pressure chambers 110 according to each ejection cycle (or print cycle). More specifically, the actuator units 21 are composed of three piezoelectric sheets made of lead zirconate titanate (PZT)-based ceramic materials having ferroelectricity. Each of the piezoelectric sheets is a continuous plate with a size covering a plurality of the pressure chambers 110. Individual electrodes are formed in respective positions opposing the pressure chambers 110 on the uppermost piezoelectric sheet. Common electrodes are interposed between the uppermost piezoelectric sheet and the piezoelectric sheet lying underneath the uppermost sheet, throughout entire surfaces of the sheets.

The common electrodes are equally held in the ground potential in an area corresponding to the entire pressure chambers 110. Each of the individual electrodes is connected to the driver IC 25. The driver IC 25 applies, individually to each of the plurality of individual electrodes, a driving pulse signal having a predetermined driving potential and the ground potential. Thus, portions held between the individual electrodes and the pressure chambers 110 in the actuator units 21 serve as individual actuators. Also, a plurality of actuators as many as the pressure chambers 110 is provided to constitute the actuator units 21. The actuator units 21 are so-called unimorph-type actuators in which one piezoelectric sheet placed farthest from the pressure chambers 110 is used as an active layer and the remaining two piezoelectric sheets are used as inactive layers.

The driver IC 25 receives a drive signal and a plurality of ejection waveform signals having differing waveforms from a recording processing ASIC 80. The drive signal is a signal issuing instructions to any one of the plurality of ejection waveform signals. The driver IC 25 sequentially receives the drive signal from the recording processing ASIC 80 and then feeds, as a drive pulse signal, an ejection waveform signal indicated by the drive signal among the plurality of ejection waveform signals to an individual electrode of the actuator unit 21 in each ejection cycle. When the drive pulse signal is input to the individual electrode from the driver IC 25, a piezoelectric sheet corresponding to this electrode is deformed and ink in the pressure chamber 110 is applied with pressure (ejection energy) to eject ink droplets having amounts according to a waveform of the drive pulse single from each of the ejection ports 108.

Further, all the ejection ports 108 of six head units 2 of the recording head 1 (i.e., all the ejection ports 108 of the recording head 1) have a positional relationship such that all projection points produced by vertically projecting these ejection ports on an arbitrary imaginary line extending in a main scanning direction are arrayed at equal intervals (approximately 84 μm) corresponding to a resolution of 300 dpi. Therefore, in an image recorded on a sheet P, a dot row formed with a plurality of dots (including non-ejection dots where no ink is deposited) located in a conveying direction corresponds to a single ejection port 108. In the present embodiment, the recording head 1 includes 2520 ejection ports 108 of #1 to #2520 in total.

The recording processing ASIC 80 will be described below by returning to FIG. 1. The recording processing ASIC 80 executes a recording process for recording an image on the sheet P based on input image data received from the image processing device 20. The recording processing ASIC 80 includes a reception circuit 81, a drive-signal generation circuit 82, a recording-head control circuit 83, and a mechanical-system drive control circuit 84.

The reception circuit 81 receives the input image data transmitted from the image processing device 20. The drive-signal generation circuit 82 rearranges the input image data received by the reception circuit 81 in a format conforming to an array pattern of the ejection ports 108 of the recording head 1 and then generates a drive signal of the recording head 1 based on the rearranged input image data. In the present embodiment, when receiving at least a part of pixels (data) constituting the input image data from the image processing device 20, the drive-signal generation circuit 82 starts generating a drive signal in accordance with the part of pixels received.

The recording-head control circuit 83 outputs a plurality of ejection waveform signals and the drive signal generated by the drive-signal generation circuit 82 to the driver IC 25 of the recording head 1, based on a control signal from a CPU 31, to be described later, of the image processing device 20. The mechanical-system drive control circuit 84 controls a belt conveying mechanism 13 and feeding rollers 5a and 5b based on a control signal from the CPU 31. In other words, using the recording head 1, the belt conveying mechanism 13, and the feeding rollers 5a and 5b, an image in accordance with the drive signal generated by the drive-signal generation circuit 82 is recorded on the sheet P.

Next, the image processing device 20 will be described in detail below. The image processing device 20 includes a network interface 30, a CPU (Central Processing Unit) 31, a ROM (Read Only Memory) 32, a RAM (Random Access Memory) 33, a print-data storage device 34, a RIP CPU 35, an image-data storage device 36, an image-data transmission circuit 37, a quantization processing ASIC 38, a correction-value storage device 50, a correction circuit 60, an input-image-data transmission circuit 55, and a clock generation circuit 56.

The network interface 30 is connected to an external terminal device 10 via a LAN or the like. The CPU 31 is a CPU that performs controls to control an overall operation of the inkjet printer 101. The ROM 32 stores various types of programs executed by the CPU 31 and the RIP CPU 35. The RAM 33 is used as a work area of the CPU 31 and the RIP CPU 35. The print-data storage device 34 stores print data (PDL data) received from the external terminal device 10 vie the network interface 30. The clock generation circuit 56 generates a clock signal at every predetermined time and then outputs the generated clock signal to the correction circuit 60.

The RIP CPU 35 is a CPU executing well-known RIP (Raster Image Processing) processing for print data stored on the print-data storage device 34 in accordance with instructions from the CPU 31 to generate M-value image data (M is a natural number satisfying M>N (N is a natural number satisfying N≥2)) where pixels are arranged in a matrix manner corresponding to image recording areas of the sheet P and each pixel is expressed with M tones. The M-value image data (multi-value image data) generated by the RIP CPU 35 is stored on the image-data storage device 36. The image-data transmission circuit 37 transmits the M-value image data stored on the image-data storage device 36 to the quantization processing ASIC 38 in accordance with instructions from the CPU 31.

The quantization processing ASIC 38 executes an error diffusion process for converting the M-value image data received from the image-data transmission circuit 37 into N-value image data having a smaller number of tones (low tone image data) for ejection. When, for example, an image having two tones can be recorded by the recording head 1, quantization to two values is executed. And, when an image having four tones can be is recorded, quantization to four values is executed. Further, the quantization processing ASIC 38 transmits the N-value image data generated by the error diffusion process to the correction circuit 60. The following description will be made for an example that the M-value image data is 256-value image data where each pixel is expressed by 256 tones; the recording head 1 is a head capable of recording an image with 4 tones; and the N-value image data is 4-value image data where each pixel is expressed by 4 tones.

Next, the error diffusion process executed by the quantization processing ASIC 38 will be described in detail with reference to FIGS. 5A and 5B. In the error diffusion process, one of the pixels constituting the M-value image data is sequentially selected as a target pixel. The target pixel is sequentially shifted in the main scanning direction (the right direction in this example), in which a pixel of the upper left corner of the M-value image data is designated as a starting point, and upon reaching a pixel of the right end, the target pixel is sequentially shifted in the main scanning direction from a pixel of the left end of the next raster (a line shifted by a size of one pixel in the sub-scanning direction). The raster refers to a pixel row formed with a plurality of pixels corresponding to a dot belonging to a dot row formed with a plurality of dots arrayed in the main scanning direction on the sheet P, in the M-value image data.

Figures 5A, 5B:
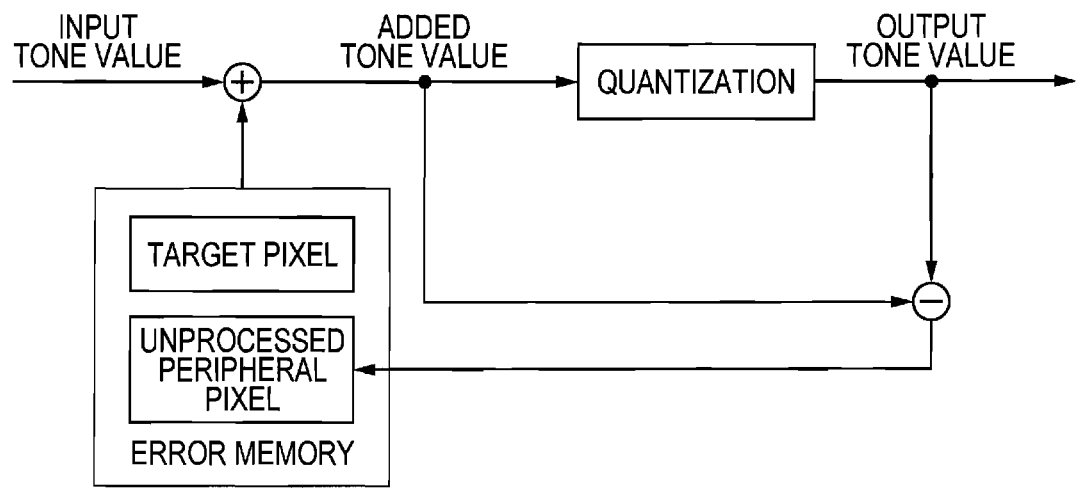
FIG. 5A is an explanatory diagram of an error diffusion process executed by a quantization processing ASIC shown in FIG. 1.
FIG. 5B is an explanatory diagram of an error diffusion matrix used in the error diffusion process.

As shown in FIG. 5A, when a tone value (input tone value) of a target pixel is acquired, a registered error value with respect to the target pixel stored on an error memory is added to the input tone value and then an added tone value is calculated. The error memory refers to a memory for storing a registered error value for each pixel. An error value (a value obtained by subtracting an output tone value from an added tone value as described later) generated via processing of the target pixel is diffused to a plurality of unprocessed pixels located in a periphery of the target pixel at a predetermined ratio to be stored as a registered error value of each pixel. When a registered error value has been previously registered, the error value is stored by being added to this registered error value. In other words, at the time when a certain pixel is processed as a target pixel, a value obtained by integrating, at a predetermined ratio, error values each generated in a plurality of peripheral pixels processed prior to the target pixel has been stored as a registered error value for the target pixel.

Subsequently, the thus-calculated added tone value is quantized to four tones based on comparison with predetermined threshold values and then an output tone value of the target pixel is determined. Then, the output tone value is subtracted from the added tone value and thereby an error value of the target pixel is calculated. The thus-calculated error value is diffused to unprocessed peripheral pixels at predetermined ratios and then stored (added to a value previously stored) as a registered error value with respect to each peripheral pixel in the error memory. The ratios of diffusing the error value of the target pixel to a plurality of peripheral pixels are determined based on the error diffusion matrix shown in FIG. 5B, for example. In the error diffusion matrix, each numerical value is a weighting coefficient specified according to a relative position of a peripheral pixel by designating the target pixel (*) as the reference. In other words, a value obtained by multiplying the error value of the target pixel by the weighting coefficient corresponding to each peripheral pixel is diffused to each peripheral pixel. The processing as described above is executed for all the pixels constituting the M-value image data to be processed and then N-value image data is generated.

The N-value image data generated by the quantization processing ASIC 38 in this manner is image data in which pixels are arranged in a matrix manner in the main scanning direction and the sub-scanning direction corresponding to an image recording area of the sheet P, as shown in FIG. 6A. This N-value image data contains a plurality of vertical pixel rows corresponding to the respective ejection ports 108. This vertical pixel row contains a plurality of pixels corresponding to a plurality of dots on the sheet P where ink ejected from one ejection port 108 can be deposited. Further, the plurality of pixels contained in the vertical pixel row is arrayed in an order in accordance with an array order in the conveying direction of the plurality of dots corresponding to the plurality of pixels. The tone value of each pixel in the N-value image data represents an ejection amount (liquid droplet amount) of the ink ejected from the ejection port 108. In the present embodiment, as shown in FIG. 6B, with respect to the N-value image data, a tone where no ink droplet is ejected from the ejection port 108 is designated as "0," a tone where a small ink droplet is ejected from the ejection port 108 is designated as "1," a tone where a medium ink droplet is ejected from the ejection port 108 is designated as "2," and a tone where a large ink droplet is ejected from the ejection port 108 is designated as "3." Further, a liquid droplet amount (ejection amount) of a small droplet is 8 pl, a liquid droplet amount of a medium droplet is 14 pl, and a liquid droplet amount of a large droplet is 20 pl.

In production of the recording head 1 for ejecting ink from a plurality of ejection ports 108, since the ejection ports 108 differ from each other in ejection characteristics, ejection amounts of the ink ejected from the respective ejection ports 108 vary. Therefore, when an image is recorded on the sheet P using such a recording head 1, a problem that density nonuniformity is generated is produced. Therefore, in the present embodiment, N-value image data generated by the quantization processing ASIC 38 is corrected using the correction-value storage device 50 and the correction circuit 60 and thereby the generation of density nonuniformity is suppressed. The correction-value storage device 50 and the correction circuit 60 will be described in detail below.

Figures 7A, 7B:
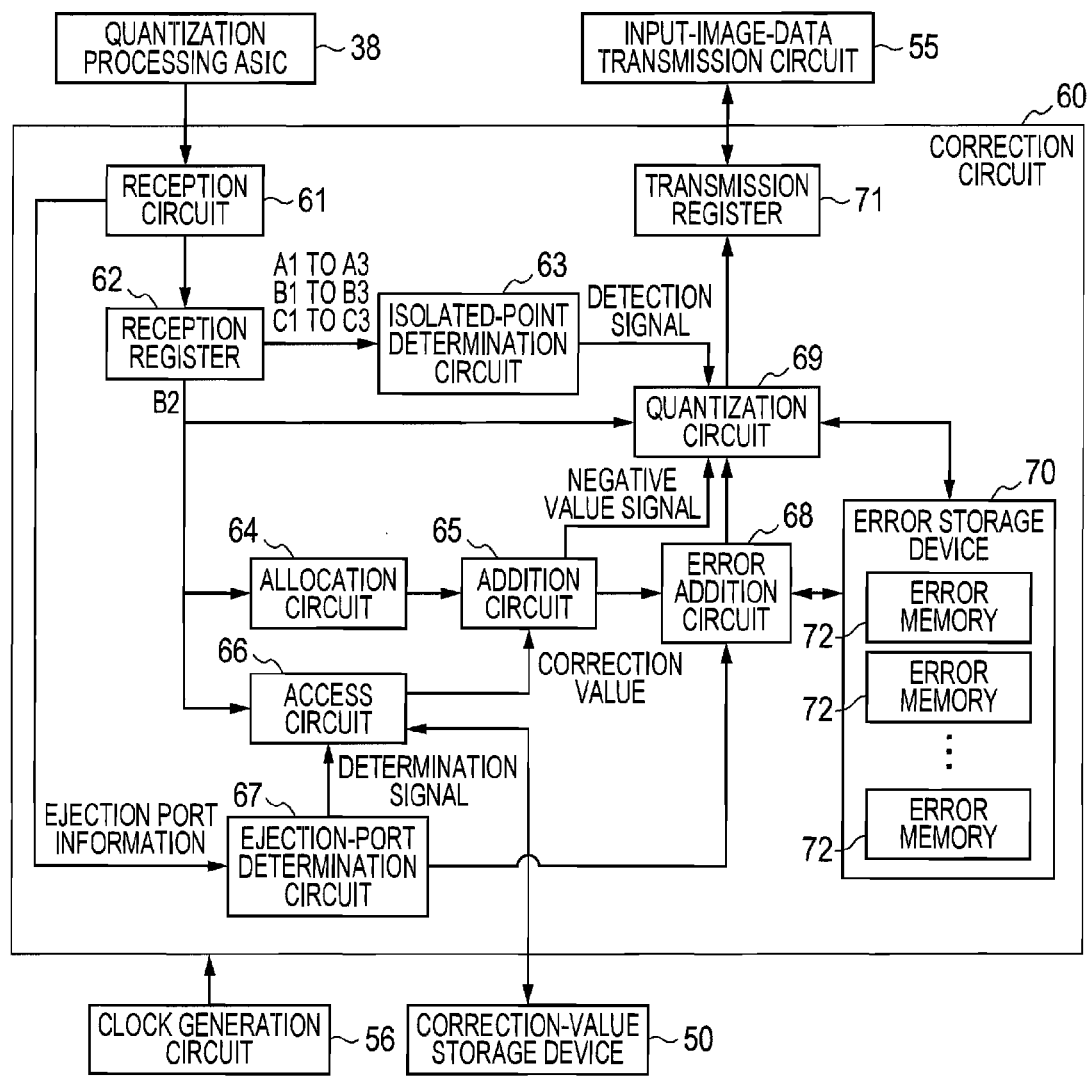
FIG. 7A represents a table illustrating a correction-value storage device shown in FIG. 1.
FIG. 7B is an electrical configuration of a correction circuit shown in FIG. 1.

As shown in FIG. 7A, the correction-value storage device 50 stores a correction value for correcting a variation in an ejection amount of ink ejected from the ejection port 108 of the recording head 1 corresponding to each ejection port 108. Further, the correction-value storage device 50 stores four correction values with respect to one ejection port 108, corresponding to each of four tones of the N-value image data. A variation in an ejection amount of the ink ejected from each ejection port 108 increases with an increase in the size of ink droplets of the ejected ink. Therefore, in the present embodiment, the four correction values for one ejection port 108 are stored so that, in the four tones of the N-value image data, a correction value corresponding to a tone associated with a larger ejection amount of ink has a larger absolute value.

This correction value stored on the correction-value storage device 50 is calculated, for example, in the following manner. Initially, ink is ejected from each ejection port 108 of the recording head 1 and then a test pattern where a straight line is formed for each ejection port 108 on the sheet P is formed. Thereafter, the test pattern formed on the sheet P is read using a scanner or the like, and an ejection amount of the ink ejected from each ejection port 108 is detected based on a density of each straight line of the read test pattern. Then, a correction value of each ejection port 108 is calculated based on this ejection amount detected with respect to each ejection port 108. For example, with respect to the ejection port 108 having an ink ejection amount larger than a predetermined reference value, a correction value having a negative value is set, and with respect to the ejection port 108 having an ink ejection amount smaller than the predetermined reference value, a correction value having a positive value is set. Note that a correction value stored on the correction-value storage device 50 indicates a relative magnitude, and this magnitude has a value variable depending on the number of tones of L tones and a magnitude of each representative tone value set in an allocation process executed by an allocation circuit 64 to be described later. For example, in a comparison of 100 tones and 256 tones in the number of tones of the L tones set in the allocation process, the absolute value of a correction value stored on the correction-value storage device 50 is larger in the case of 256 tones.

The correction circuit 60 is a circuit for correcting N-value image data generated by the quantization processing ASIC 38 based on a correction value stored on the correction-value storage device 50. As shown in FIG. 7B, the correction circuit 60 includes, a reception circuit 61, a reception register 62, an isolated-point determination circuit 63, an allocation circuit 64, an addition circuit 65, an access circuit 66, an ejection-port determination circuit 67, an error addition circuit 68, a quantization circuit 69, an error storage device 70, and a transmission register 71. These circuits in the correction circuit 60 execute processing by changing a pixel serving as a pixel to be processed, every time receiving a clock signal from the clock generation circuit 56. Further, the allocation circuit 64, the addition circuit 65, the access circuit 66, the ejection-port determination circuit 67, the error addition circuit 68, the quantization circuit 69, and the error storage device 70 serve as a corrector.

The reception circuit 61 receives N-value image data from the quantization processing ASIC 38. Then, the reception circuit 61 selects one of the pixels constituting the received N-value image data as a transmission pixel Z every time receiving a clock signal from the clock generation circuit 56 and outputs the transmission pixel Z to the reception register 62. This transmission pixel Z is sequentially shifted in the main scanning direction (the right direction), in which a pixel of the upper left corner (an upper left pixel in FIG. 6A) of the N-value image data is designated as a starting point, and upon reaching a pixel of the right end, the transmission pixel Z is sequentially shifted in the main scanning direction from a pixel of the left end of the next raster. Further, the reception circuit 61 outputs ejection port information indicating the ejection port 108 corresponding to the transmission pixel Z to the ejection-port determination circuit 67.

Figure 8A:
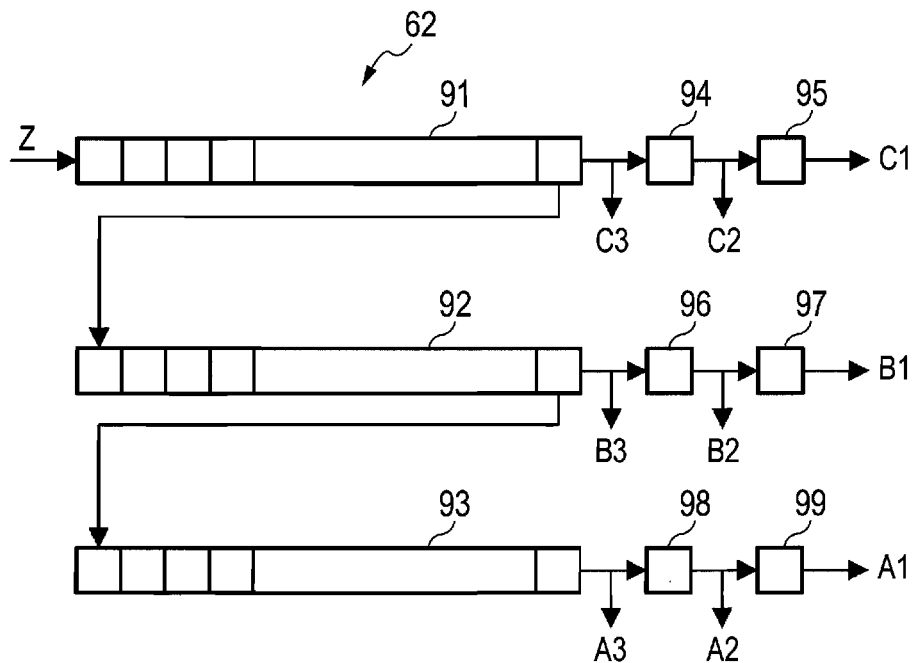
FIGS. 8A and 8B are explanatory diagrams of a reception register shown in FIG. 7B.

The reception register 62 is a circuit for temporarily storing a pixel received from the reception circuit 61. As shown in FIG. 8A, the reception register 62 includes three shift registers 91 to 93 and six delay circuits 94 to 99. The shift registers 91 to 93 are shift resisters each having 2520 stages corresponding to the number of the ejection ports 108 and sequentially shifting data to a posterior stage every time receiving a clock signal from the clock generation circuit 56. The input stage of the shift register 91 is connected to the reception circuit 61. Further, the input stage of the shift register 92 is connected to the output stage of the shift register 91, and the input stage of the shift register 93 is connected to the output stage of the shift register 92. The delay circuits 94 to 99 are circuits for outputting input data by being delayed by one clock signal. The delay circuits 94 and 95 are connected in series to the output stage of the shift register 91, the delay circuits 96 and 97 are connected in series to the output stage of the shift register 92, and the delay circuits 98 and 99 are connected in series to the output stage of the shift register 93.

Next, operations of the reception register 62 will be described below. As shown in FIG. 8A, when a transmission pixel Z of the N-value image data is input to the input stage of the shift register 91, a pixel C3 adjacent to the transmission pixel Z on the downstream side in the conveying direction is output from the output stage of the shift register 91. Further, a pixel C2 input previously by one clock signal prior to the pixel C3 is output from the delay circuit 94, and a pixel C1 input previously by one clock signal prior to the pixel C2 is output from the delay circuit 95. In the same manner, pixels B1 to B3 adjacent to the pixels C1 to C3, respectively, on the downstream side in the conveying direction are output from the shift register 92 and the delay circuits 96 and 97, and pixels A1 to A3 adjacent to the pixels B1 to B3, respectively, on the downstream side in the conveying direction are output from the shift register 93 and the delay circuits 98 and 99.

According to the operations described above, as shown in FIG. 8B, the reception register 62 can output a pixel group of a 3×3 matrix region containing the pixel B2 and eight adjacent pixels adjacent to the pixel B2. Various types of circuits of the correction circuit 60 execute various types of processing for the pixel B2 as a pixel to be processed. This pixel to be processed is sequentially shifted in the main scanning direction in the same manner as the transmission pixel Z, in which a pixel of the upper left corner of the N-value image data is designated as a starting point, and upon reaching a pixel of the right end, the pixel to be processed is sequentially shifted in the main scanning direction from a pixel of the left end of the next raster. Therefore, when attention is paid to a plurality of pixels constituting a vertical pixel row of the N-value image data, a pixel of the upper end (a pixel on the most downstream side in the conveying direction) is initially selected as a pixel to be processed, and thereafter, pixels are sequentially selected as the pixel to be processed, from a pixel located on the downstream side in the conveying direction.

The reception register 62 outputs the pixel to be processed (the pixel B2) that is outputted from the delay circuit 96, to the allocation circuit 64, the access circuit 66, and the quantization circuit 69. Further, the reception register 62 outputs a pixel group of a 3×3 matrix region containing the pixel to be processed as the center to the isolated-point determination circuit 63.

The isolated-point determination circuit 63 executes an isolated-point extraction process for determining whether the pixel to be processed is an isolated-point pixel and a thin-line-pixel extraction process for determining whether the pixel to be processed is a thin-line pixel, based on the pixel group of a 3×3 matrix region received from the reception circuit 61.

Figure 9A:
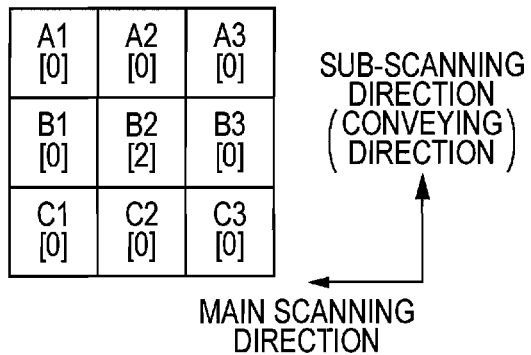
FIGS. 9A, 9B, 9C, and 9D are explanatory diagrams illustrating an isolated-point extraction process and a thin-line-pixel extraction process executed by an isolated-point determination circuit shown in FIG. 7B.

In the isolated-point extraction process, when in the pixel group of a 3×3 matrix region, as shown in FIG. 9A, a tone value of the pixel B2 (the pixel to be processed) is any one of the tone values "1," "2," and "3" associated with any one of a small droplet, a medium droplet, and a large droplet, and also tone values of other pixels (pixels A1 to A3, pixels B1 and B3, and pixels C1 to C3) adjacent to the pixel B2 are a tone value of "0" associated with non-ejection, the isolated-point determination circuit 63 determines that the pixel to be processed is an isolated-point pixel.

Figure 9B:
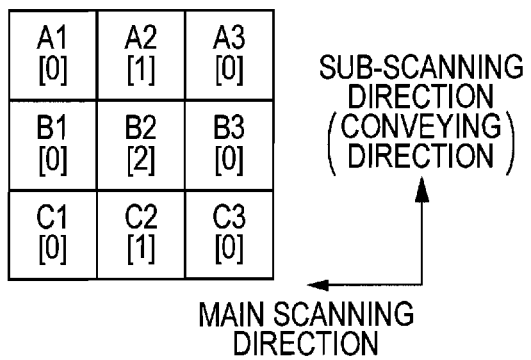
Figure 9C:
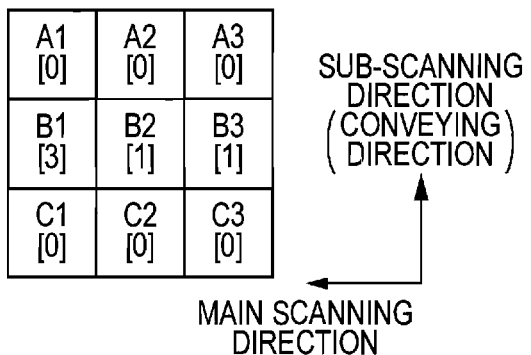
Figure 9D:
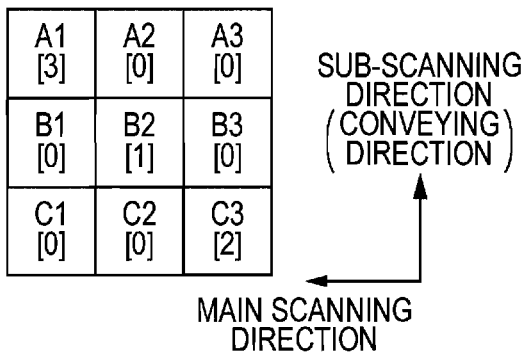

In the thin-line-pixel extraction process, when in the pixel group of a 3×3 matrix region, as shown in FIG. 9B, all the tone values of the pixel B2 (the pixel to be processed) and adjacent pixels (the pixel A2 and the pixel C2) adjacent to the pixel B2 in the vertical direction are any one of "1," "2," and "3" and also tone values of all other pixels are "0," the isolated-point determination circuit 63 determines that the pixel to be processed is a thin-line pixel. In the same manner, in the pixel group of a 3×3 matrix region, when as shown in FIG. 9C, all the tone values of the pixel B2 and adjacent pixels (the pixel B1 and the pixel B3) adjacent to the pixel B2 in the horizontal direction are any one of "1," "2," and "3" and also tone values of all other pixels are "0," or when as shown in FIG. 9D, all the tone values of the pixel B2 and adjacent pixels (the pixel A1 and the pixel C3, or the pixel A3 and the pixel C1) adjacent to the pixel B2 in the oblique direction are any one of "1," "2," and "3" and also tone values of all other pixels are "0," the pixel to be processed is determined as a thin-line pixel.

When having determining the pixel to be processed as an isolated-point pixel in the isolated-point-pixel extraction process, or when having determining the pixel to be processed as a thin-line pixel in the thin-line-pixel extraction process, the isolated-point determination circuit 63 outputs a detection signal indicating that the pixel to be processed is a tone holding pixel to the quantization circuit 69.

The allocation circuit 64 executes the allocation process for allocating a tone value of each pixel of the N-value image data generated by the quantization processing ASIC 38 to one of four representative tone values of L tone values of L tones. In the present embodiment, the L tones represent 256 tones, and as shown in FIG. 6B, when the tones of the N-value image data are "0," "1," "2," and "3," representative tone values of "0," "80," "140," and "200" are allocated, respectively. A ratio of any two representative tone values of the four representative tone values is set to be the same as a ratio of liquid droplet amounts associated with the tones of the N-value image data, corresponding to these optional representative tone values. For example, representative tone values corresponding to a tone of "1" and a tone of "2" in the N-value image data are "80" and "140," respectively, and its ratio is 8:14. And, liquid droplet amounts associated with a tone of "1" and a tone of "2" in the N-value image data are "8 pl" and "14 pl," respectively, and its ratio is 8:14 that is the same as that of the representative tone values.

The allocation circuit 64 allocates one of the four representative tone values of the tone values of 256 tones to the tone value (input tone value) of the pixel to be processed received from the reception register 62, and then outputs the allocated representative tone value of the pixel to be processed to the addition circuit 65.

Figure 8B:
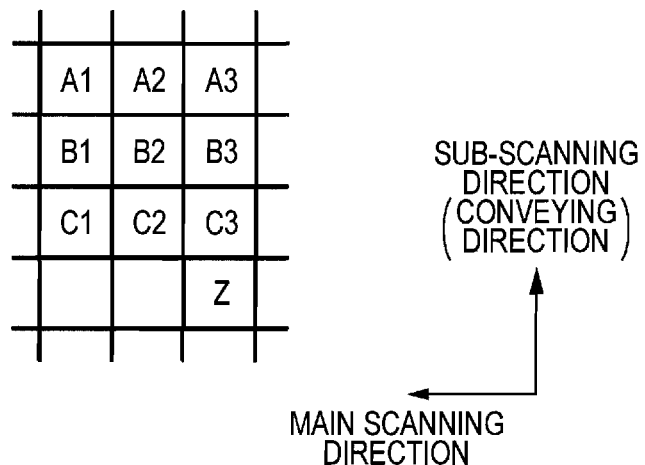

The ejection-port determination circuit 67 determines the ejection port 108 corresponding to the pixel to be processed that is outputted from the reception register 62, based on ejection port information for the transmission pixel Z received from the reception circuit 61. As shown in FIG. 8B, the ejection port 108 corresponding to the pixel to be processed (the pixel B2) that is outputted from the reception register 62 is the same as the ejection port 108 corresponding to a pixel that is outputted from the reception circuit 61 by one clock signal prior to the transmission pixel Z. Therefore, when, for example, the ejection port information received from the reception circuit 61 indicates the ejection port #2, the ejection port 108 corresponding to the pixel to be processed is determined as the ejection port #1. The ejection-port determination circuit 67 outputs a determination signal indicating this determination result to the access circuit 66 and the error addition circuit 68.

On the basis of the input tone value of the pixel to be processed received from the reception register 62 and the ejection port 108 corresponding to the pixel to be processed indicated by the determination signal received from the ejection-port determination circuit 67, the access circuit 66 determines a correction value for the pixel to be processed, by referring to the correction-value storage device 50. Then, the access circuit 66 outputs the determined correction value to the addition circuit 65.

The addition circuit 65 adds the correction value received from the access circuit 66 to the representative tone value of the pixel to be processed that is outputted from the allocation circuit 64 and then corrects the representative tone value to a corrected tone value and outputs the corrected tone value of the pixel to be processed, obtained by this correction, to the error addition circuit 68. Further, the addition circuit 65 outputs a negative value signal to the quantization circuit 69, only when the correction value added to the representative tone value of the pixel to be processed has a negative value.

The error addition circuit 68 extracts an error value for the ejection port 108 corresponding to the pixel to be processed stored on the error storage device 70, based on the determination signal received from the ejection-port determination circuit 67. Then, the error addition circuit 68 adds the extracted error value to the corrected tone value of the pixel to be processed received from the addition circuit 65, thereby calculating an error-added tone value, and outputs the calculated error-added tone value to the quantization circuit 69. The error storage device 70 includes 2520 error memories 72 corresponding to the respective 2520 ejection ports 108. An error value generated via processing of a pixel to be processed is stored on the error memory 72 for the ejection port 108 corresponding to the pixel to be processed.

The quantization circuit 69 is a circuit for determining an output tone value of a pixel to be processed. Specifically, upon receiving the error-added tone value of a pixel to be processed from the error addition circuit 68, when having not received the aforementioned detection signal for the pixel to be processed from the isolated-point determination circuit 63, the quantization circuit 69 quantizes the error-added tone value to four tones using predetermined threshold values to determine an output tone value. In the present embodiment, as shown in FIG. 6C, error-added tone values less than or equal to 0 corresponds to an output tone value of "0", error-added tone values greater than 0 and less than 110 corresponds to an output tone value of "1", error-added tone values greater than or equal to 110 and less than 170 corresponds to an output tone value of "2", and error-added tone values greater than or equal to 170 corresponds to an output tone value of "3". These four tones of the output tone values each correspond to each of the four tones of the input tone values. Further, the threshold values used in quantization of the error-added tone value to four tones are not limited to the aforementioned threshold values.

On the other hand, upon receiving the error-added tone value of the pixel to be processed from the error addition circuit 68, when having received the aforementioned detection signal for the pixel to be processed from the isolated-point determination circuit 63, the quantization circuit 69 determines that the pixel to be processed is a tone holding pixel. And, when having not received a negative value signal for the pixel to be processed determined as a tone holding pixel from the addition circuit 65, the quantization circuit 69 quantizes the error-added tone value to four tones to determine an output tone value. In contrast, when the negative signal has been received from the addition circuit 65, an output tone value for the pixel to be processed is determined to be the same value as the input tone value. Thereby, with respect to the isolated-point pixel and the thin-line pixel, ink is reliably ejected onto the positions of dots corresponding to pixels, thereby suppressing degradation of the image quality of an image recorded on the sheet P.

Further, the quantization circuit 69 subtracts a representative tone value corresponding to the determined output tone value from the error-added tone value of the pixel to be processed to calculate an error value of the pixel to be processed. The quantization circuit 69 overwrites the error memory 72 associated with the ejection port 108 corresponding to the pixel to be processed in the error storage device 70, by using the thus-calculated error value. Still further, when the correction circuit 60 has completed processing of all the pixels constituting low tone image data for an image recorded on the sheet P of one page, the quantization circuit 69 initializes error values stored on all the error memories 72 to zero.

The quantization circuit 69 outputs the determined output tone value of the pixel to be processed to the transmission register 71. The transmission register 71 is a register for temporarily storing an output tone value of a pixel to be processed that is outputted from the quantization circuit 69. This transmission register 71 stores output tone values for a plurality of pixels by sequentially changing a pixel serving as a pixel to be processed.

The output tone values for a plurality of pixels stored on the transmission register 71 in this manner are output to the recording processing ASIC 80, one raster at a time, by the input-image-data transmission circuit 55. Specifically, when the transmission register 71 stores the output tone values of pixels contained in one raster, the input-image-data transmission circuit 55 outputs, on an as-needed basis, the output tone values of the pixels contained in one raster to the recording processing ASIC 80. Therefore, the input-image-data transmission circuit 55 outputs a pixel having been already processed by the correction circuit 60 to the recording processing ASIC 80, prior to completion of processing of all the pixels of the N-value image data by the correction circuit 60. As a result, the drive-signal generation circuit 82 in the recording processing ASIC 80 can start generating a drive signal at an early timing, and therefore recording on the sheet P can be started at an early timing.

Figure 10:
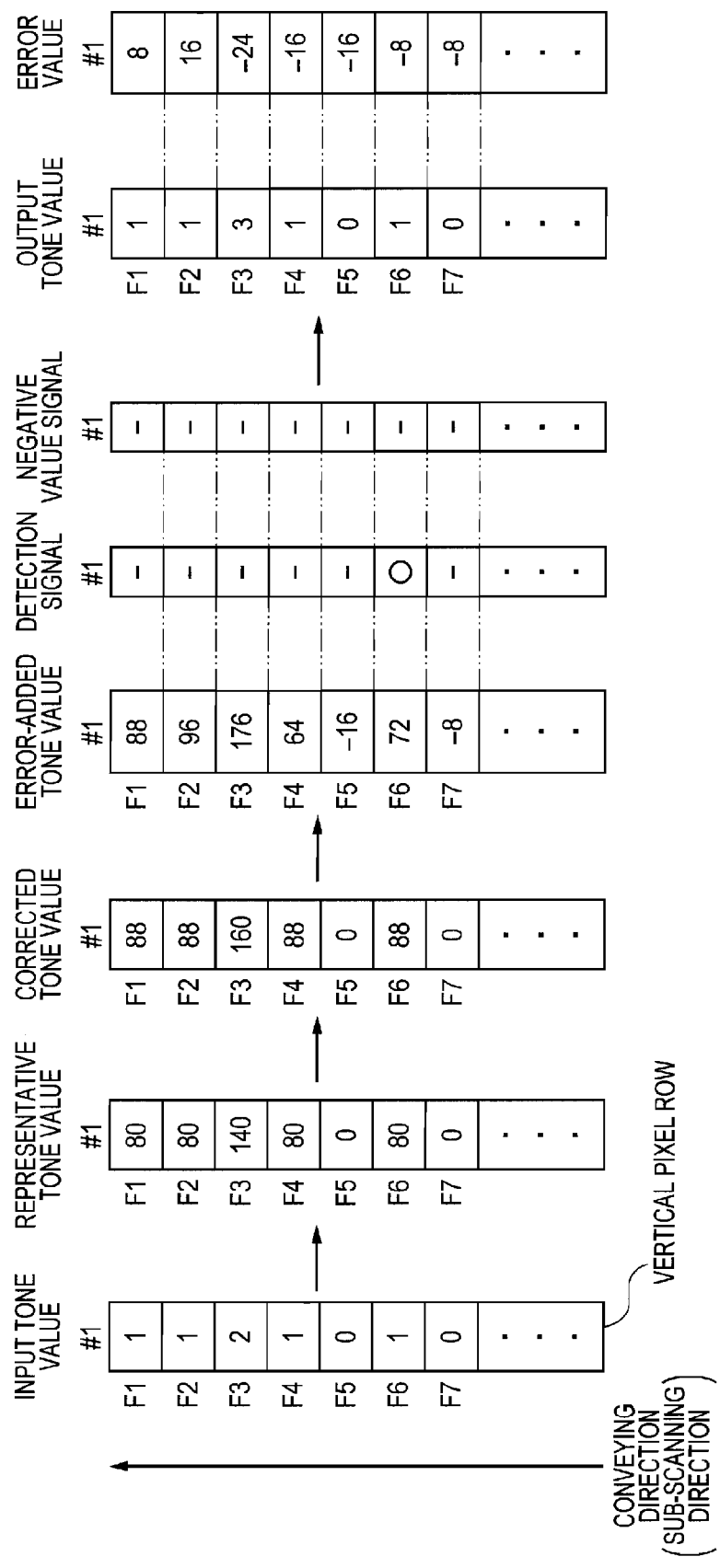
FIG. 10 is an explanatory diagram of processing operations of the correction circuit shown in FIG. 1.
Figure 11:
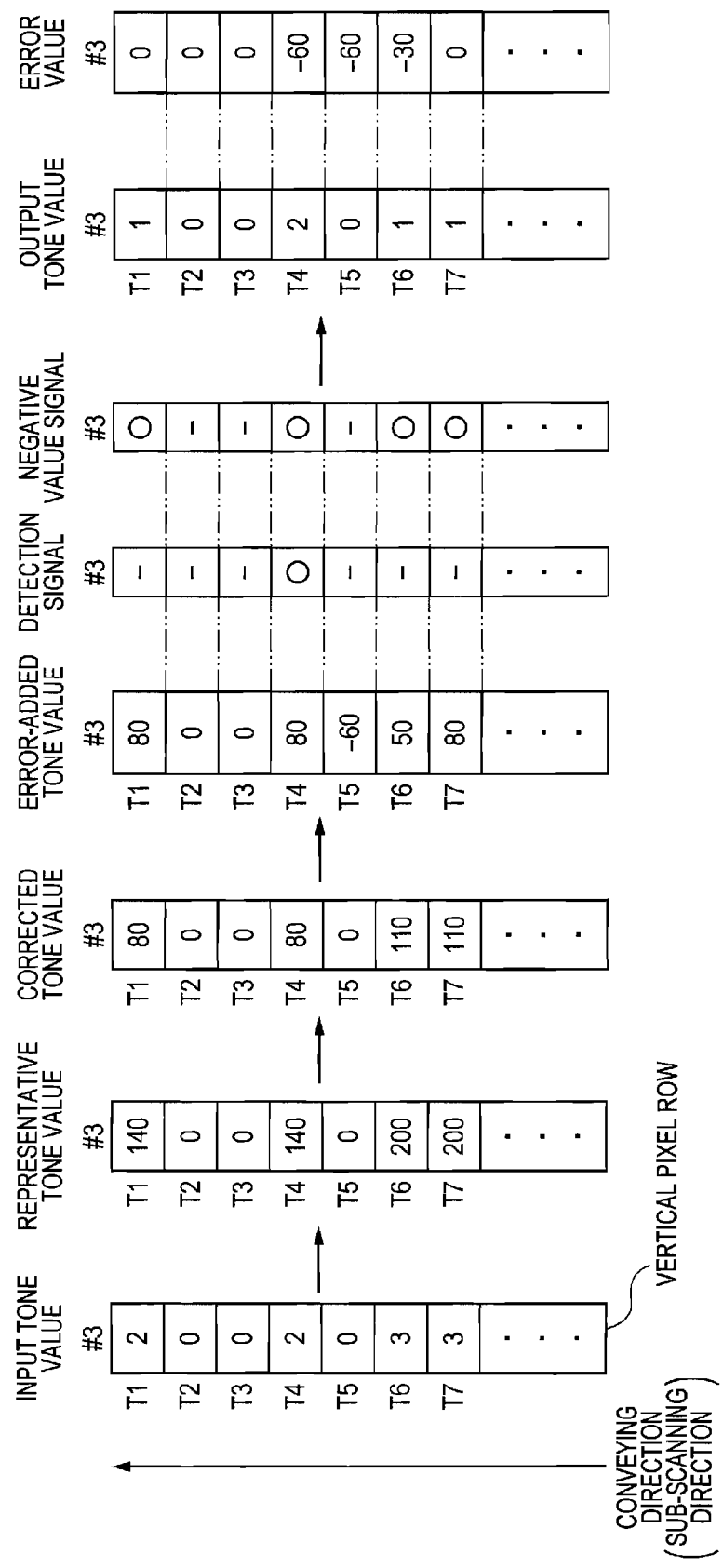
FIG. 11 is another explanatory diagram of processing operations of the correction circuit shown in FIG. 1.

Processing operations of the correction circuit 60 will be described with reference to FIG. 10 and FIG. 11. FIG. 10 is a view illustrating changes in a value of each pixel in a vertical pixel row corresponding to the ejection port #1. Symbol F1 is assigned to a pixel on the most downstream side in the conveying direction and then symbols having a number increased in increments of 1 from this number toward the upstream side in the conveying direction are assigned to pixels upstream from this pixel F1 in the conveying direction. The pixel F1 on the most downstream side in the conveying direction refers to a pixel corresponding to a dot where ink ejected from the ejection port #1 is deposited first upon recording an image on the sheet P among a plurality of dots belonging to a dot row corresponding to the ejection port #1 on the sheet P.

Further, the ERROR VALUE in FIG. 10 refers to an error value stored on the error memory 72 corresponding to the ejection port #1 immediately after completion of processing of the pixel to be processed by the correction circuit 60. In the expression of the column of the DETECTION SIGNAL in FIG. 10, "○" indicates that when an output tone value of the pixel to be processed is determined by the quantization circuit 69, a detection signal for the pixel to be processed has been received from the isolated-point determination circuit 63, and "–" indicates that no detection signal has been received. In the expression of the column of the NEGATIVE VALUE SIGNAL in FIG. 10, "○" indicates that when an output tone value of the pixel to be processed is determined by the quantization circuit 69, a negative value signal has been received from the addition 65, and "–" indicates that no negative value signal has been received. Note that, in the example of FIG. 10, there is no "○". In the same manner, FIG. 11 is a view illustrating changes in a tone value of each pixel in a vertical pixel row corresponding to the ejection port #3. Symbol T1 is assigned to a pixel on the most downstream side in the conveying direction and then symbols having a number increased in increments of 1 from this number toward the upstream side in the conveying direction are assigned to pixels upstream from this pixel T1 in the conveying direction.

Initially, the reception circuit 61 receives the N-value image data that is outputted from the quantization processing ASIC 38. Thereafter, the reception circuit 61 selects, as a transmission pixel Z, one of a plurality of pixels constituting the received N-value image data every time receiving a clock signal from the clock generation circuit 56 and outputs the selected transmission pixel Z to the reception register 62. Further, the reception circuit 61 outputs ejection port information for the transmission pixel Z to the ejection-port determination circuit 67. Thereby, the ejection-port determination circuit 67 determines the ejection port 108 corresponding to the pixel to be processed, and outputs the determination result to the access circuit 66.

The reception register 62 having received the transmission pixel Z outputs the pixel B2 having the positional relation of FIG. 8B with the transmission pixel Z, as a pixel to be processed, to the allocation circuit 64, the access circuit 66, and the quantization circuit 69. Further, the reception register 62 outputs a pixel group of a 3×3 matrix region containing the pixel to be processed as the center to the isolated-point determination circuit 63. Thereby, the isolated-point determination circuit 63 executes the isolated-point extraction process for determining whether the pixel to be processed is an isolated-point pixel and the thin-line-pixel extraction process for determining whether the pixel to be processed is a thin-line pixel. Then, when the isolated-point determination circuit 63 determines that the pixel to be processed is an isolated-point pixel or a thin-line pixel, a detection signal is output to the quantization circuit 69.

The allocation circuit 64 having received a tone value (input tone value) of the pixel to be processed allocates one of the four representative tone values of 256 tone values to the input tone value of the pixel to be processed. When, for example, the pixel to be processed is a pixel F2 as shown in FIG. 10, an input tone value of the pixel F2 is "1" and therefore a representative tone value of "80" is allocated. The allocation circuit 64 outputs the representative tone value of the pixel to be processed to the addition circuit 65.

When receiving the pixel to be processed from the reception register 62 and also receiving the determinant result from the ejection-port determination circuit 67, the access circuit 66 determines a correction value for the pixel to be processed by referring to the correction-value storage device 50. When, for example, the pixel to be processed is the pixel F2, an input tone value of the pixel F2 is "1" and also the ejection port 108 corresponding to the pixel F2 is the ejection port #1, and therefore, as shown in FIG. 7A, "8" is determined as a correction value. The access circuit 66 outputs the determined correction value to the addition circuit 65.

The addition circuit 65 adds the correction value received from the access circuit 66 to the representative tone value of the pixel to be processed received from the allocation circuit 64, thereby correcting the representative value to obtain a corrected tone value. When, for example, the pixel to be processed is the pixel F2, a representative correction value of the pixel F2 is "80" and also a correction value for the pixel F2 is "8," and therefore a corrected tone value of the pixel F2 is "88 (=80+8)." The addition circuit 65 outputs the corrected tone value of the pixel to be processed to the error addition circuit 68. Further, when, as shown in FIG. 11, a correction value added to a representative tone value of the pixel to be processed is a negative value, the addition circuit 65 outputs a negative value signal to the quantization circuit 69.

The error addition circuit 68 adds an error value for the ejection port 108 corresponding to the pixel to be processed stored on the error storage device 70 to the corrected tone value of the pixel to be processed that is outputted from the addition circuit 65, thereby calculating an error-added tone value. When, for example, the pixel to be processed is the pixel F2 as shown in FIG. 10, a value "8" is stored, as an error value at the time of processing the pixel F1 as a pixel to be processed, on the error memory 72 for the ejection port #1 corresponding to the pixel F2. Therefore, "8" as an error value is added to "88" as a corrected tone value of the pixel F2 to obtain an error-added tone value of "96 (=88+8)." The error addition circuit 68 outputs the calculated error-added tone value to the quantization circuit 69.

Upon receiving the error-added tone value of the pixel to be processed from the error addition circuit 68, when having not received both of the aforementioned detection signal for the pixel to be processed from the isolated-point determination circuit 63 and the aforementioned negative value signal for the pixel to be processed from the addition circuit 65, the quantization circuit 69 quantizes the error-added tone value to four tones and then determines an output tone value. When, for example, the pixel to be processed is a pixel F6, a detection signal from the isolated-point determination circuit 63 has been received but a negative value signal from the addition circuit 65 has not been received, and therefore an output tone value of the pixel F6 having an error-added tone value of "72" is determined to be "1."

On the other hand, upon receiving the error-added tone value of the pixel to be processed from the error addition circuit 68, when having received both of the aforementioned detection signal for the pixel to be processed from the isolated-point determination circuit 63 and the aforementioned negative value signal for the pixel to be processed from the addition circuit 65, the quantization circuit 69 determines that the input tone value of the pixel to be processed received from the reception register 62 is an output tone value. When, for example, as shown in FIG. 11, the pixel to be processed is a pixel T4, the detection signal has been received from the isolated-point determination circuit 63 and also the negative value signal has been received from the addition circuit 65, and therefore an output tone value of the pixel T4 is determined to be "2" that is equal to an input tone value of the pixel T4.

Further, the quantization circuit 69 subtracts a representative tone value corresponding to the determined output tone value from the error-added tone value, thereby calculating an error value for the pixel to be processed. As shown in FIG. 10, for example, when the pixel to be processed is the pixel F2, an error-added tone value of the pixel F2 is "96". Further, a representative tone value is "80" since an output tone value of the pixel F2 is "1". Therefore, an error value of the pixel F2 is "16 (=96-80)."

The quantization circuit 69 overwrites an error value stored on the error memory 72, in the error storage device 70, associated with the ejection port 108 corresponding to the pixel to be processed, by using the thus-calculated error value. The quantization circuit 69 outputs the determined output tone value of the pixel to be processed to the transmission register 71. In this way, in the transmission register 71, the pixel to be processed is sequentially changed and then output tone values of pixels constituting the N-value image data are stored.

As described above, according to the present embodiment, M-value image data is quantized to N-value image data, and thereafter a tone value of each pixel of the N-value image data is corrected based on ejection characteristics according to each ejection port. In addition, an error generated when the tone value of each pixel of the N-value image data is corrected based on ejection characteristics according to each ejection port is diffused to pixels corresponding to the same ejection port. Therefore, an error for suppressing density nonuniformity is not diffused to pixels corresponding to other ejection ports having different ink ejection characteristics, which suppresses degradation of the image quality of an image recorded on the sheet P.

Further, according to the present embodiment, in the allocation circuit 64 of the correction circuit 60, four representative tone values allocated to a tone value of each pixel of the N-value image data are selected from 256 tone values of 256 tones that is equal to the tones of the M-value tone values (i.e., L and M have the same integer value). Thereby, the correction circuit 60 can accurately execute processing for correcting density nonuniformity, as compared with a case where the four representative tone values are selected from tone values of tones (e.g., 100 tones) less than the tones of the M-value image data (256 tones). As a modification, the four tone values may be set from tone values of multi-value tones having more tones than 256 tones (i.e., L may be an integer larger than M). In this case, the correction circuit 60 can more accurately execute processing for correcting density nonuniformity.

Further, according to the present embodiment, when the pixel to be processed is a tone holding pixel and also a negative value signal has been received from the addition circuit 65, the pixel to be processed is not corrected based on a correction value stored on the correction-value storage device 50. Thereby, with respect to the isolated-point pixel and the thin-line pixel, ink is reliably ejected onto the positions of dots corresponding to pixels, which suppresses degradation of the image quality of an image recorded on the sheet P.

According to the present embodiment, a ratio of any two representative tone values of the four representative tone values is set so as to be the same as a ratio of liquid droplet amounts associated with the tones of the N-value image data corresponding to these two representative tone values. Thereby, the correction circuit 60 can more accurately execute processing for correcting density nonuniformity, and therefore it is possible to further suppress density nonuniformity of an image recorded on the sheet P.

Further, according to the present embodiment, when the pixel to be processed is any one of a thin-line pixel and an isolated-point pixel and also a correction value stored on the correction-value storage device 50 corresponding to the pixel to be processed is a negative value, the correction circuit 60 sets an output tone value of the pixel to be processed to be the same as an input tone value. Thus, with respect to the isolated-point pixel and the thin-line pixel, ink is reliably ejected onto the positions of dots corresponding to pixels, which suppresses degradation of the image quality of an image recorded on the sheet P.

Further, the four correction values according to any one of the ejection port 108 stored on the correction-value storage device 50 are set so that, in the four tones of the N-value image data, a correction value corresponding to a tone associated with a larger amount of ejected ink has a larger absolute value. Thus, with respect to all liquid droplet sizes ejected from the ejection port 108, a variation of the ejection amount can be reduced, and therefore density nonuniformity of an image recorded on a sheet P can be further suppressed.

While the invention has been described in detail with reference to the above aspects thereof, it would be apparent to those skilled in the art that various changes and modifications may be made therein without departing from the scope of the claims.

In the above-described embodiment, for example, a pixel to be processed selected by the correction circuit 60 is sequentially selected in the main scanning direction by designating a pixel of the upper left corner of the N-value image data as a starting point, but the invention is not limited to this. It is possible that, for example, a pixel of the upper left corner of the N-value image data is designated as the starting point and then a selection is sequentially made in the sub-scanning direction.

Further, in the above-described embodiment, a ratio of any two representative tone values of the four representative tone values is set so as to be the same as a ratio of liquid droplet amounts associated with the tones of the N-value image data corresponding to these two representative tone values. However, the invention is not limited to this. It is possible that, for example, a ratio of any two representative tone values of the four representative tone values is set so as to be the same as a ratio of optical densities of dots upon deposition of liquid droplet amounts associated with the tones of the N-value image data corresponding to these two representative tone values on the positions of the dots on the sheet P. In this case, when a ratio of optical densities of dots is 5:8 upon deposition of liquid amounts of "8 pl" and "14 pl" associated with tones of "1" and "2" in the N-value image data, respectively, on the positions of the dots on the sheet P, representative tone values corresponding to tones of "1" and "2" in the N-value image data are set to be, for example, "50" and "80", respectively. In this case, too, density nonuniformity of an image recorded on the sheet P can be further suppressed.

Further, in the above-described embodiment, the quantization processing ASIC 38 generates N-value image data from M-value image data by an error diffusion process, but it is possible to generate the N-value image data from the M-value image data by well-known dithering. The dithering sets a threshold value upon quantization for each pixel so as not to be fixed as a predetermined value but so as to reduce a quantization error statistically.

Further, in the above-described embodiment, the inkjet printer 101 includes the image processing device 20. However, the external terminal device 10 may include the image processing device 20. In this case, input image data generated by the image processing device 20 is transferred from the external terminal device 10 to the inkjet printer 101. Further, in the above-described embodiment, the input-image-data transmission circuit 55 transmitted pixels to the recording processing ASIC 80 one raster at a time (on a raster-by-raster basis), but may transmit the pixels to the recording processing ASIC 80 on a pixel-by-pixel basis.

Further, the liquid ejection apparatus may be a color inkjet recording apparatus including a plurality of recording heads for ejecting ink of different colors. In this case, the following configuration may be adopted: the image processing device 20 generates a plurality of M-value image data corresponding to respective ink colors from print data stored on the print-data storage device 34; and thereafter, from each of the plurality of M-value image data, N-value image data corresponding to each ink color is generated and then the correction circuit 60 applies the processing for suppressing generation of density nonuniformity to each N-value image data. Further, a configuration for ejecting ink of different colors from a single recording head may be adopted.

Further, in the above-described embodiment, the feeding rollers 5*a* and 5*b* and the belt conveying mechanism 13 conveyed the sheet P, but the invention is not limited to this as long as a conveying mechanism capable of conveying the sheet P in the conveying direction is used. For example, the conveying mechanism may be configured so as to have a plurality of roller pairs disposed at predetermined intervals in the conveying direction to convey the sheet P by nipping the sheet P by each of roller pairs in the conveying direction.

The invention is also applicable to image processing devices for transmitting M-value image data to liquid ejecting devices that eject liquid other than ink. The invention is also applicable to serial-type inkjet printers that move a recording head relative to a sheet P at rest to record an image on the sheet P, without being limited to line-type inkjet printers. The invention is also applicable to facsimile and copying apparatuses without being limited to printers. Further, processes performed by hardware such as the correction circuit 60 and the like may be performed by a CPU that executes corresponding programs.

What is claimed is:

1. An image processing device configured to generate input image data used in a liquid ejecting device including: a liquid ejecting head having an ejection port for ejecting liquid onto a recording medium; a moving mechanism configured to move at least one of the liquid ejecting head and the recording medium such that a relative positional relationship of the liquid ejecting head and the recording medium varies with respect to a predetermined direction; and a recording controller configured to control the liquid ejecting head and the moving mechanism based on the input image data in which tone values of respective pixels corresponding to dots on one recording medium are represented by N tones (N is an integer greater than or equal to two) such that liquid of liquid amounts associated with the tone values of the respective pixels in the input image data is ejected to positions of dots corresponding to the respective pixels, the image processing device comprising:

a correction-value memory storing a correction value in association with the ejection port, the correction value being for correcting variations in the liquid amounts of liquid ejected from the ejection port;

a quantizer configured to generate N-value image data from M-value image data, the M-value image data being image data in which tone values of respective pixels corresponding to dots on one recording medium are represented by M tones (M is an integer greater than the integer N), the N-value image data being image data in which tone values of respective pixels are represented by N tones; and a corrector configured to correct the N-value image data generated by the quantizer based on the correction value, thereby generating the input image data, wherein the corrector is configured to perform:

designating a target pixel belonging to a pixel array corresponding to the ejection port, the target pixel being designated, sequentially from one end to another end of the pixel array, as one of a plurality of pixels arranged in an array direction of the pixel array, the pixel array being formed with the plurality of pixels in the N-value image data corresponding to a plurality of dots formed by the ejection port respectively;

allocating a corresponding one of N representative tone values out of L tone values of L tones (L is an integer greater than the integer N) to a tone value of the target pixel of the N-value image data generated by the quantizer;

adding the correction value to a representative tone value of the target pixel, thereby obtaining a corrected tone value of the target pixel;

quantizing the corrected tone value of the target pixel to N tones; and diffusing an error generated in quantizing the corrected tone value to the corrected tone value of an adjacent pixel adjacent to the target pixel in the array direction.

2. The image processing device according to claim 1, wherein the integer L is an integer greater than or equal to the integer M.

3. The image processing device according to claim 1, wherein a ratio of the representative tone values corresponding to respective ones of any two tones of N tones in the N-value image data is same as a ratio of liquid amounts of liquid ejected from the ejection port associated with the respective ones of the any two tones.

4. The image processing device according to claim 1, wherein a ratio of the representative tone values corresponding to respective ones of any two tones of N tones in the N-value image data is same as a ratio of optical densities of dots that are formed when liquid of liquid amounts associated with the respective ones of the any two tones is ejected onto the recording medium.

5. The image processing device according to claim 1, wherein the integer N is an integer greater than or equal to three;

wherein the correction-value memory stores N correction values for one ejection port so as to correspond to respective ones of N tones of the N-value image data; and wherein the N correction values of the ejection port are stored in the correction-value memory such that a correction value corresponding to one of N tones of the N-value image data associated with a larger liquid amount has a larger absolute value.

6. The image processing device according to claim 1, wherein the liquid ejecting head has a plurality of ejection ports; and wherein the correction-value memory is configured to store a plurality of correction values in association with respective ones of the plurality of ejection ports, the plurality of correction values being values for correcting variations in the liquid amounts of liquid ejected from the respective ones of the plurality of ejection ports.

7. The image processing device according to claim 6, further comprising an extractor configured to perform at least one of:

extracting a target pixel as a tone holding pixel in a case where tone values of all pixels adjacent to the target pixel in the N-value image data are tone values indicating that liquid amounts of liquid ejected from the ejection ports are associated with zero and where a tone value of the target pixel is a tone value indicating that a liquid amount of liquid ejected from the ejection port is associated with a liquid amount larger than zero; and extracting the target pixel as the tone holding pixel in a case where tone values of the target pixel and adjacent pixels adjacent to the target pixel in one direction are tone values indicating that liquid amounts of liquid ejected from the ejection ports are associated with liquid amounts larger than zero and where tone values of all adjacent pixels adjacent to the target pixel in directions other than the one direction are tone values indicating that liquid amounts of liquid ejected from the ejection ports are associated with zero, wherein the corrector is configured not to perform the correction based on the correction value for a non-correction pixel out of a plurality of pixels of the N-value image data generated by the quantizer, the non-correction pixel being a pixel that is extracted by the extractor as the tone holding pixel and that corresponds to an ejection port of which the correction value is a negative value.

8. The image processing device according to claim 6, further comprising a transmitter configured to transmit the input image data generated by the corrector to the recording controller of the liquid ejecting device, wherein the moving mechanism comprises a conveying mechanism configured to convey the recording medium in the predetermined direction, the predetermined direction being a conveying direction;

wherein the liquid ejecting head comprises a line head extending in a direction perpendicular to the conveying direction and configured to eject liquid from the plurality of ejection ports in a state where the liquid ejecting head is fixed at a position so as to eject liquid onto the recording medium being conveyed by the conveying mechanism;

wherein the liquid ejecting head comprises a driver configured to drive ejection of liquid from respective ones of the plurality of ejection ports in accordance with drive signals outputted from the recording controller;

wherein the recording controller comprises a drive-signal generator configured to, upon receiving at least part of the input image data from the transmitter, start generating the drive signal in accordance with the input image data;

wherein the corrector is configured to sequentially perform the quantizing from a pixel corresponding to a dot belonging to a dot array at a downstream side in the conveying direction out of dot arrays each formed by a plurality of dots arranged in the direction perpendicular to the conveying direction on the recording medium, in a plurality of pixels of the N-value image data generated by the quantizer; and wherein the transmitter is configured to transmit, to the drive-signal generator, at least part of pixels for which the quantizing is finished by the corrector, before the corrector finishes the quantizing for all pixels of the N-value image data.

9. The image processing device according to claim 6, wherein the corrector comprises an error storage device including error memories corresponding to the respective ones of the plurality of ejection ports; and wherein the quantizing comprises:
reading, from the error storage device, an error value for one of the plurality of ejection ports corresponding to the target pixel;
adding the error value to the corrected tone value of the target pixel, thereby calculating an error-added tone value;
subtracting a representative tone value allocated in the allocating from the error-added tone value, thereby calculating a next error value of the target pixel; and
overwriting one of the error memories associated with the ejection port corresponding to the target pixel, by using the next error value.

10. An image processing device configured to generate input image data used in a liquid ejecting device including a liquid ejecting head having an ejection port for ejecting liquid onto a recording medium, the image processing device comprising:

a correction-value memory storing a correction value in association with the ejection port, the correction value being for correcting variations in the liquid amounts of liquid ejected from the ejection port;

a quantizer configured to generate N-value image data from M-value image data, the M-value image data being image data in which tone values of respective pixels corresponding to dots on one recording medium are represented by M tones, the N-value image data being image data in which tone values of respective pixels are represented by N tones (N is an integer greater than or equal to two; M is an integer greater than the integer N); and a corrector configured to correct the N-value image data generated by the quantizer based on the correction value, thereby generating the input image data, wherein the corrector is configured to perform:

designating a target pixel belonging to a pixel array corresponding to the ejection port, the target pixel being designated, sequentially from one end to another end of the pixel array, as one of a plurality of pixels arranged in an array direction of the pixel array, the pixel array being formed with the plurality of pixels in the N-value image data corresponding to a plurality of dots formed by the ejection port respectively;

allocating a corresponding one of N representative tone values out of L tone values of L tones (L is an integer greater than the integer N) to a tone value of the target pixel of the N-value image data generated by the quantizer;

adding the correction value to a representative tone value of the target pixel, thereby obtaining a corrected tone value of the target pixel;

quantizing the corrected tone value of the target pixel to N tones; and diffusing an error generated in quantizing the corrected tone value to the corrected tone value of an adjacent pixel adjacent to the target pixel in the array direction.

11. A method of controlling an image processing device configured to generate input image data used in a liquid ejecting device including: a liquid ejecting head having an ejection port for ejecting liquid onto a recording medium; a moving mechanism configured to move at least one of the liquid ejecting head and the recording medium such that a relative positional relationship of the liquid ejecting head and the recording medium varies with respect to a predetermined direction; and a recording controller configured to control the liquid ejecting head and the moving mechanism based on the input image data in which tone values of respective pixels corresponding to dots on one recording medium are represented by N tones (N is an integer greater than or equal to two) such that liquid of liquid amounts associated with the tone values of the respective pixels in the input image data is ejected to positions of dots corresponding to the respective pixels, the image processing device including a correction-value memory storing a correction value in association with the ejection port, the correction value being for correcting variations in the liquid amounts of liquid ejected from the ejection port, the method comprising:

generating N-value image data from M-value image data, the M-value image data being image data in which tone values of respective pixels corresponding to dots on one recording medium are represented by M tones (M is an integer greater than the integer N), the N-value image data being image data in which tone values of respective pixels are represented by N tones; and correcting the N-value image data based on the correction value, thereby generating the input image data, wherein the correcting comprises:

designating a target pixel belonging to a pixel array corresponding to the ejection port, the target pixel being designated, sequentially from one end to another end of the pixel array, as one of a plurality of pixels arranged in an array direction of the pixel array, the pixel array being formed with the plurality of pixels in the N-value image data corresponding to a plurality of dots formed by the ejection port respectively;

allocating a corresponding one of N representative tone values out of L tone values of L tones (L is an integer greater than the integer N) to a tone value of the target pixel of the N-value image data;

adding the correction value to a representative tone value of the target pixel, thereby obtaining a corrected tone value of the target pixel;

quantizing the corrected tone value of the target pixel to N tones; and diffusing an error generated in quantizing the corrected tone value to the corrected tone value of an adjacent pixel adjacent to the target pixel in the array direction.

12. The method according to claim 11, wherein the integer L is an integer greater than or equal to the integer M.

13. The method according to claim 11, wherein a ratio of the representative tone values corresponding to respective ones of any two tones of N tones in the N-value image data is same as a ratio of liquid amounts of liquid ejected from the ejection port associated with the respective ones of the any two tones.

14. The method according to claim 11, wherein a ratio of the representative tone values corresponding to respective ones of any two tones of N tones in the N-value image data is same as a ratio of optical densities of dots that are formed when liquid of liquid amounts associated with the respective ones of the any two tones is ejected onto the recording medium.

15. The method according to claim 11, wherein the integer N is an integer greater than or equal to three;

wherein the correction-value memory stores N correction values for one ejection port so as to correspond to respective ones of N tones of the N-value image data; and wherein the N correction values of the ejection port are stored in the correction-value memory such that a correction value corresponding to one of N tones of the N-value image data associated with a larger liquid amount has a larger absolute value.

16. The method according to claim 11, wherein the liquid ejecting head has a plurality of ejection ports; and wherein the correction-value memory is configured to store a plurality of correction values in association with respective ones of the plurality of ejection ports, the plurality of correction values being values for correcting variations in the liquid amounts of liquid ejected from the respective ones of the plurality of ejection ports.

17. The method according to claim 16, further comprising at least one of:

extracting a target pixel as a tone holding pixel in a case where tone values of all pixels adjacent to the target pixel in the N-value image data are tone values indicating that liquid amounts of liquid ejected from the ejection ports are associated with zero and where a tone value of the target pixel is a tone value indicating that a liquid amount of liquid ejected from the ejection port is associated with a liquid amount larger than zero; and extracting the target pixel as the tone holding pixel in a case where tone values of the target pixel and adjacent pixels adjacent to the target pixel in one direction are tone values indicating that liquid amounts of liquid ejected from the ejection ports are associated with liquid amounts larger than zero and where tone values of all adjacent pixels adjacent to the target pixel in directions other than the one direction are tone values indicating that liquid amounts of liquid ejected from the ejection ports are associated with zero, wherein the corrector is configured not to perform the correction based on the correction value for a non-correction pixel out of a plurality of pixels of the N-value image data, the non-correction pixel being a pixel that is extracted by the extractor as the tone holding pixel and that corresponds to an ejection port of which the correction value is a negative value.

18. The method according to claim 16, wherein the image processing device has an error storage device including error memories corresponding to the respective ones of the plurality of ejection ports; and wherein the quantizing comprises:

reading, from the error storage device, an error value for one of the plurality of ejection ports corresponding to the target pixel;

adding the error value to the corrected tone value of the target pixel, thereby calculating an error-added tone value;

subtracting a representative tone value allocated in the allocating from the error-added tone value, thereby calculating a next error value of the target pixel; and overwriting one of the error memories associated with the ejection port corresponding to the target pixel, by using the next error value.

19. A non-transitory computer-readable storage medium storing computer-readable instructions executable by a processor of an image processing device configured to generate input image data used in a liquid ejecting device including a liquid ejecting head having an ejection port for ejecting liquid onto a recording medium, the image processing device including a correction-value memory storing a correction value in association with the ejection port, the correction value being for correcting variations in the liquid amounts of liquid ejected from the ejection port, the computer-readable instructions, when executed by the processor, causing the processor to perform:

generating N-value image data from M-value image data, the M-value image data being image data in which tone values of respective pixels corresponding to dots on one recording medium are represented by M tones, the N-value image data being image data in which tone values of respective pixels are represented by N tones (N is an integer greater than or equal to two; M is an integer greater than the integer N); and correcting the N-value image data based on the correction value, thereby generating the input image data, wherein the correcting comprises:

designating a target pixel belonging to a pixel array corresponding to the ejection port, the target pixel being designated, sequentially from one end to another end of the pixel array, as one of a plurality of pixels arranged in an array direction of the pixel array, the pixel array being formed with the plurality of pixels in the N-value image data corresponding to a plurality of dots formed by the ejection port respectively;

allocating a corresponding one of N representative tone values out of L tone values of L tones (L is an integer greater than the integer N) to a tone value of the target pixel of the N-value image data;

adding the correction value to a representative tone value of the target pixel, thereby obtaining a corrected tone value of the target pixel;

quantizing the corrected tone value of the target pixel to N tones; and diffusing an error generated in quantizing the corrected tone value to the corrected tone value of an adjacent pixel adjacent to the target pixel in the array direction.

\* \* \* \* \*